US011610208B2

(12) United States Patent
Riechers et al.

(10) Patent No.: US 11,610,208 B2
(45) Date of Patent: Mar. 21, 2023

(54) INTELLIGENT MANAGEMENT OF AUTHORIZATION REQUESTS

(71) Applicant: Block, Inc., San Francisco, CA (US)

(72) Inventors: Christina Riechers, San Francisco, CA (US); Michael Cormier, San Francisco, CA (US); Zachary Margolis, San Francisco, CA (US); Kyle Callender, San Francisco, CA (US); Trevor Luong, San Francisco, CA (US); Janaiah McClure, Oakland, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 17/461,760

(22) Filed: Aug. 30, 2021

(65) Prior Publication Data

US 2022/0051245 A1    Feb. 17, 2022

Related U.S. Application Data

(63) Continuation of application No. 16/147,152, filed on Sep. 28, 2018, now Pat. No. 11,132,689.

(51) Int. Cl.
*G06Q 20/40* (2012.01)
*G06Q 40/02* (2012.01)
*G06Q 20/20* (2012.01)

(52) U.S. Cl.
CPC ......... *G06Q 20/403* (2013.01); *G06Q 20/202* (2013.01); *G06Q 40/025* (2013.01)

(58) Field of Classification Search
CPC ... G06Q 20/403; G06Q 20/202; G06Q 40/025
See application file for complete search history.

(56) References Cited

U.S. PATENT DOCUMENTS 5,740,271 A * 4/1998 Kunkier ............... G07D 7/0047
                                                                    382/137
7,086,584 B2   8/2006 Stoutenburg et al.
(Continued)

FOREIGN PATENT DOCUMENTS

WO    2020/068405 A1    4/2020

OTHER PUBLICATIONS

"PayPal Comes to Samsung Pay: Here's How to Use It", 2018, https://www.tomsguide.com/us/add-paypay-to-samsung-pay,news-27048.html) (Year: 2018).*

(Continued)

*Primary Examiner* — Allen C Chein
(74) *Attorney, Agent, or Firm* — Lee & Hayes, P.C.

(57) ABSTRACT

Intelligent management of authorization requests are described. A server of a payment processing service can receive an authorization request to authorize a payment instrument for a predicted cost of a transaction between a first user and a second user. The server can compare the predicted cost of the transaction with an available balance of the payment instrument and determine that the available balance is less than the predicted cost of the transaction. Based on determining that the available balance is less than the predicted cost of the transaction, the server can determine that the payment instrument is not authorized for the predicted cost of the transaction and can authorize the transaction instead of declining the transaction based at least in part on a prediction of the actual cost of the transaction.

20 Claims, 18 Drawing Sheets

(56) References Cited

U.S. PATENT DOCUMENTS

| | | |
|---|---|---|
| 7,165,037 B2 | 1/2007 | Lazarus et al. |
| 7,191,151 B1 | 3/2007 | Nosek |
| 7,354,004 B2 | 4/2008 | Andersen et al. |
| 8,341,076 B1 | 12/2012 | Wilkes |
| 8,738,451 B2 | 5/2014 | Ahlers et al. |
| 10,366,451 B2 | 7/2019 | Kaznady |
| 10,445,716 B1 | 10/2019 | Riechers et al. |
| 2004/0148258 A1 | 7/2004 | Tillett |
| 2004/0153399 A1 | 8/2004 | Wilkes |
| 2005/0167487 A1 | 8/2005 | Conlon et al. |
| 2006/0242063 A1 | 10/2006 | Peterson et al. |
| 2007/0026213 A1 | 2/2007 | Craamer |
| 2010/0030687 A1 | 2/2010 | Panthaki et al. |
| 2011/0040682 A1 | 2/2011 | Vasten |
| 2011/0095086 A1 | 4/2011 | Malhotra et al. |
| 2011/0107265 A1 | 5/2011 | Buchanan et al. |
| 2012/0036073 A1 | 2/2012 | Basu et al. |
| 2012/0078784 A1 | 3/2012 | Anthony et al. |
| 2013/0013499 A1 | 1/2013 | Kalgi |
| 2014/0279525 A1 | 9/2014 | Mohsenzadeh |
| 2015/0302394 A1 | 10/2015 | Harper |
| 2017/0011599 A1 | 1/2017 | Bosch et al. |
| 2020/0104845 A1 | 4/2020 | Riechers et al. |
| 2020/0104942 A1 | 4/2020 | Riechers et al. |
| 2021/0150631 A1* | 5/2021 | Resheff .................. G06Q 40/12 |

OTHER PUBLICATIONS

"Online Expense Report", 2017, https://www.americanexpress.com/content/dam/amex/nl/assets/business/Productinformatie/en/factsheets/Amex_factsheet_expense_report_2017.pdf (Year: 2017).*

"Commercial Cards Merchant Category Code Controls," published 2002, Retrieved from the Internet URL: https://www.anz.com/Documents/Business/CommercialCard/Merchant cateogry codes control.pdf, pp. 1-21.

"Gift Card/Debit Card Activation," published Dec. 2009, Retrieved from the Internet URL: https://stackoverflow.conn/questions/1848261/gift-card-debit-card-activation, pp. 1-11.

Non-Final Office Action dated Jan. 10, 2019, for U.S. Appl. No. 16/146,973, of Riechers, C. et al., filed Sep. 28, 2018.

Non-Final Office Action dated Jan. 10, 2019, for U.S. Appl. No. 16/147,080, of Riechers, C. et al., filed Sep. 28, 2018.

Notice of Allowance dated Jun. 5, 2019, for U.S. Appl. No. 16/146,973, of Riechers, C. et al., filed Sep. 28, 2018.

Final Office Action dated Jul. 11, 2019, for U.S. Appl. No. 16/147,080, of Riechers, C. et al., filed Sep. 28, 2018.

Advisory Action dated Oct. 9, 2019, for U.S. Appl. No. 16/147,080, of Riechers, C. et al., filed Sep. 28, 2018.

Notice of Allowance dated Apr. 3, 2020, for U.S. Appl. No. 16/147,080, of Riechers, C. et al., filed Sep. 28, 2018.

Corrected Notice of Allowability dated Apr. 29, 2020, for U.S. Appl. No. 16/147,080, of Riechers, C. et al., filed Sep. 28, 2018.

Corrected Notice of Allowability dated Jun. 4, 2020, for U.S. Appl. No. 16/147,080, of Riechers, C. et al., filed Sep. 28, 2018.

Corrected Notice of Allowability dated Aug. 5, 2020, for U.S. Appl. No. 16/147,080, of Riechers, C. et al., filed Sep. 28, 2018.

Non-Final Office Action dated Nov. 3, 2020, for U.S. Appl. No. 16/147,152, of Riechers, C. et al., filed Sep. 28, 2018.

Notice of Allowance dated May 25, 2021, for U.S. Appl. No. 16/147,152, of Riechers, C. et al., filed Sep. 28, 2018.

International search Report and Written for International Application No. PCT/US2019/050250 dated Jan. 21, 2020.

Examiner Requisition for Canadian Application No. 3,111,997 dated Mar. 4, 2022.

Examination Report No. 1 for Australian Application No. 2019346848 dated Aug. 3, 2022.

* cited by examiner

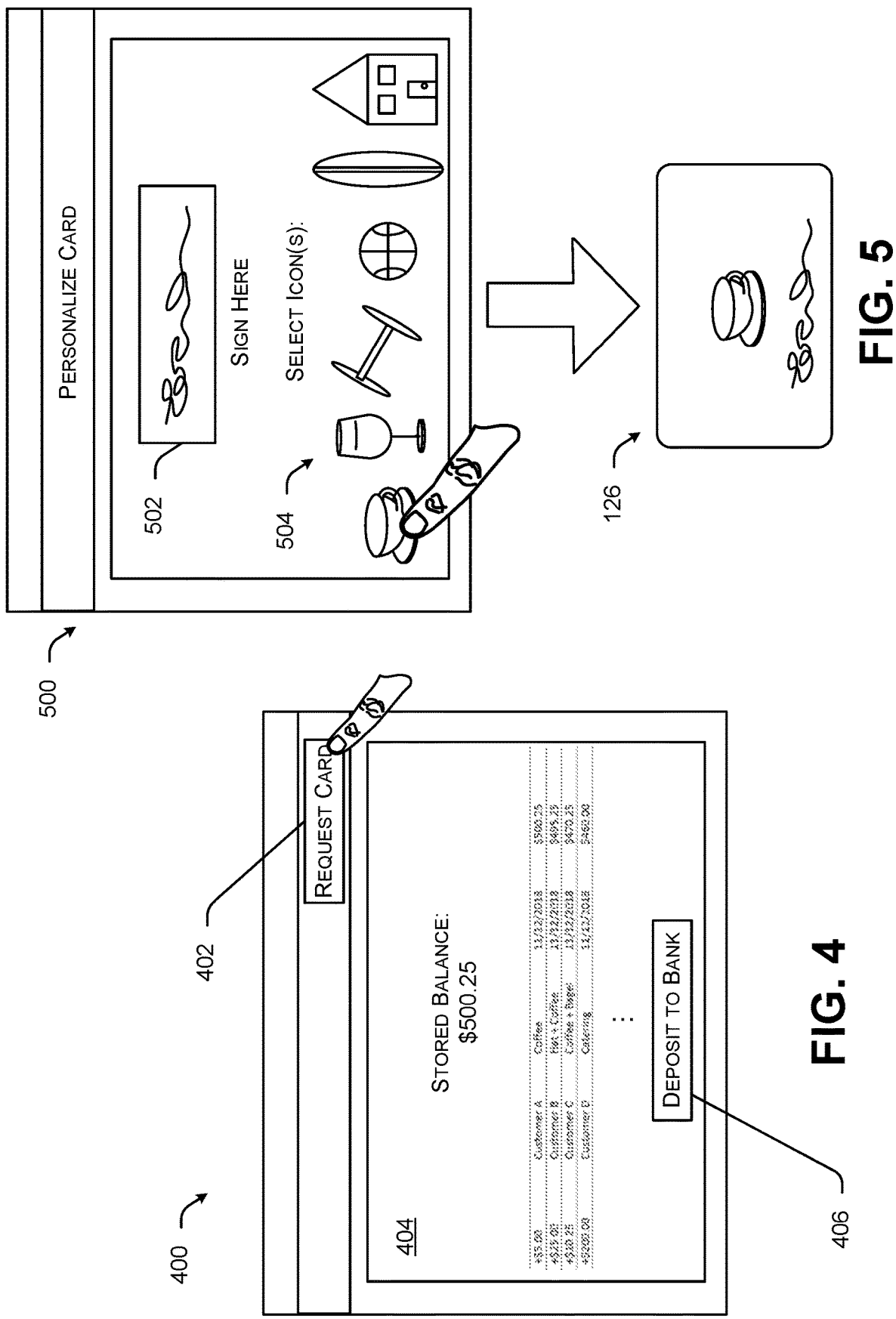

INTELLIGENT MANAGEMENT OF AUTHORIZATION REQUESTS

PRIORITY

This application is a continuation of, and claims priority to, U.S. patent application Ser. No. 16/147,152, filed on Sep. 28, 2018, entitled "Intelligent Management of Authorization Requests", which is fully incorporated by reference herein.

BACKGROUND

Payment instruments are used in a wide variety of transactions. Examples of such payment instruments include credit cards, stored value cards, debit cards, loyalty cards, library cards, membership cards, and the like. The information displayed on a credit card is typically controlled by the bank issuing the card and displays information, such as the account number, a three or four-digit authentication code, validity of the card, name of issuing bank, name of the interbank network, and the like. The payment instruments also include a hologram having embedded within security features and an integrated circuit to support Europay-Mastercard-Visa ("EMV") payment functionalities. Despite the aforementioned options, the choices for what is to appear on a payment instrument are limited. When a new payment instrument is issued to a user, that user is told (usually via a sticker on the card) to activate the payment instrument by calling a phone number or by visiting a website where the user registers the payment instrument by providing personally identifiable information.

Business owners often use multiple accounts and multiple payment instruments for their business. Accounting for business owners is complicated, in part because of the multiple payment accounts and payment instruments. Business owners often invest significant resources into managing and separating business and personal funds in a secure and fair manner. Furthermore, cash flow can be challenging for business owners. For instance, business owners want quick access to their earned funds (quicker than what is currently available via traditional banking methods). Further, business owners do not feel in control of their finances given conventional business banking techniques. That is, business owners want a transparent understanding of their cash flow.

BRIEF DESCRIPTION OF THE DRAWINGS

Features of the present disclosure, its nature and various advantages, will be more apparent upon consideration of the following detailed description, taken in conjunction with the accompanying drawings in which:

FIG. 4 illustrates an example user interface (UI) from which a merchant can send a request to link a payment instrument with a stored balance of the merchant, as described herein.

FIG. 5 illustrates an example UI from which a merchant can personalize their payment instrument, as described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
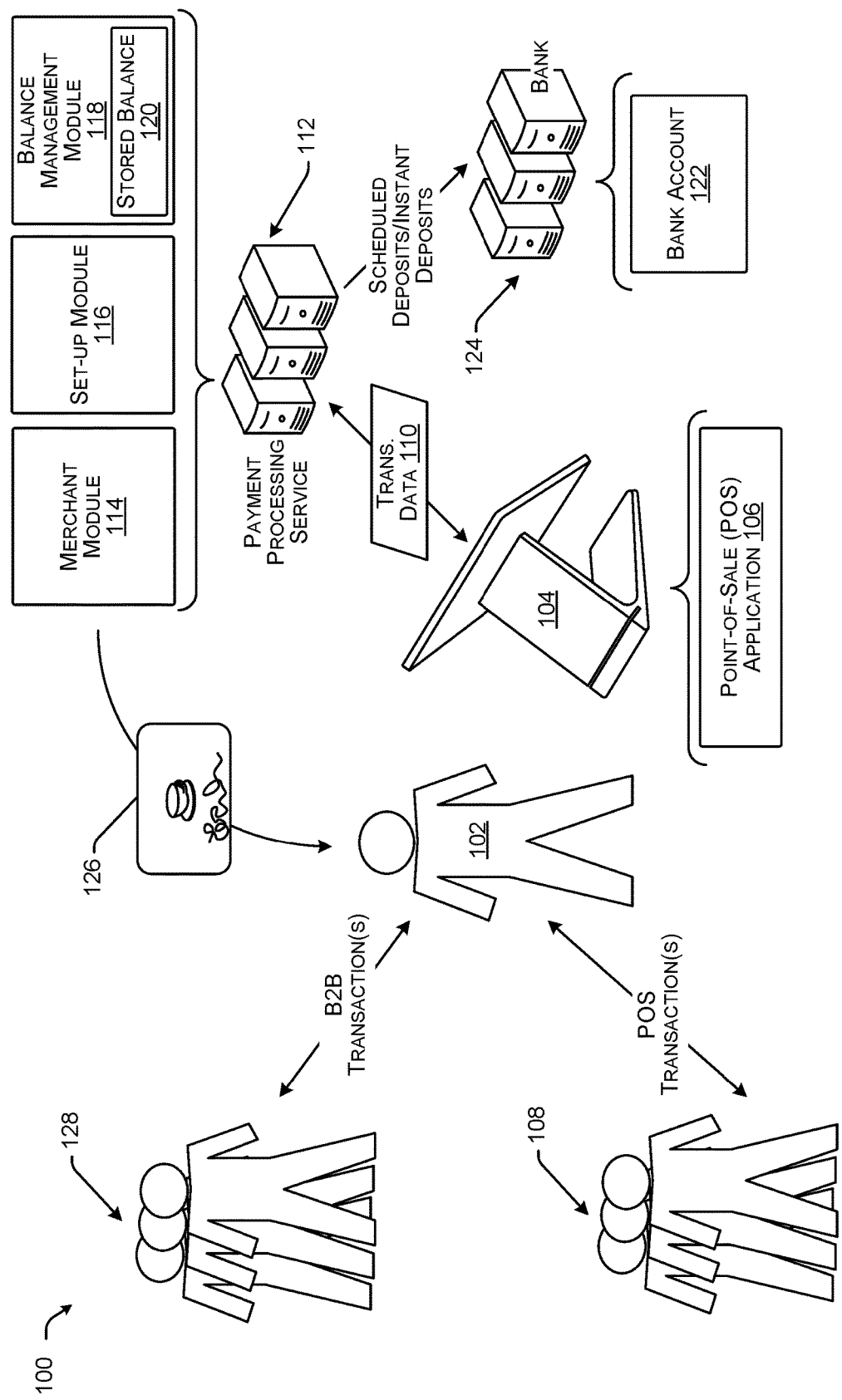
FIG. 1 illustrates an example environment for associating a payment instrument with an account that is managed by a payment processing service from POS transactions of a merchant and enabling the merchant to use the payment instrument for transactions with other merchants (e.g., business-to-business transactions), as described herein.

Techniques described herein are directed to an unconventional business banking product that allows merchants to store payment revenue securely in an account and utilize a debit card linked to the account to quickly access funds in their account. For instance, a payment processing service can process point-of-sale (POS) transactions on behalf of a merchant. Funds generated from the POS transactions can be stored in an account that is managed by the payment processing service (e.g., not a traditional bank account). In at least one example, the payment processing service can manage the account via a ledger.

The account can be associated with multiple withdrawal channels. For instance, the merchant can access the funds in the account by a scheduled deposit from the account to a linked bank account. In such an example, the payment processing service can initiate a deposit (e.g., via ACH, etc.) from the account managed by the payment processing service to the bank account at a prearranged time after a POS transaction is funded. Such scheduled deposits are often scheduled for the next business day or later.

Further, the merchant can access the funds in the account by an instant deposit from the account to a linked bank account. In such an example, the payment processing service can initiate a deposit (e.g., via debit rails, etc.) from the account managed by the payment processing service to the bank account upon receiving a request from the merchant. A request for an instant deposit can be made substantially immediately after a POS transaction is funded. Instant deposits can often be associated with an additional fee due to the increased convenience of "on demand" access to the funds in the account.

Techniques described herein are directed to yet another way that a merchant can access funds in the account: a linked debit card. The linked debit card allows the merchant to access funds in the account substantially immediately after a POS transaction is funded. As the funds do not need to be transferred from the payment processing service to a bank account, the merchant can have "on demand" access to their funds without incurring additional fees. As described herein, the merchant can personalize the debit card by adding a unique identification pattern, selecting icons, and adding other flare that is representative of the merchant and/or their business (e.g., logos, colors, etc.).

Further, techniques described herein are directed to a balance applet enables merchants to check, track, and use their funds via a single access point (e.g., a POS application on a POS terminal, a dashboard presented via a web browser, etc.). The balance applet can enable merchants to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Furthermore, the balance applet can enable merchants to visualize their cash flow to track their financial health, set aside money for upcoming obligations (e.g., savings), organize money around goals, etc. Such an applet allows merchants to feel in control of their finances by providing transparency to their cash flow and easing access to account management.

As a non-limiting example, a merchant runs his own shoe repair business. As the merchant performs shoe repairs, the merchant is paid for such services via a POS application executing on a device of the merchant (e.g., a POS terminal). Funds resulting from such services are deposited into a secure account that is managed by a payment processing service. The merchant can use a personalized debit card that is linked to his account to buy the supplies he needs for shoe repairs. Additionally, the merchant can check the balance of the account via the balance applet. For instance, the merchant can check the balance of the account at the beginning and end of each day to know where he stands. Further, the merchant can periodically transfer funds from his balance to a linked bank account for making purchases without using the debit card. That is, the merchant can store his business funds securely in a manner that he can have instant access (via the personalized debit card) and the merchant can leverage the balance applet to monitor his cash flow.

Techniques described herein are directed to unconventional means for activating a debit card linked to an account of a merchant. For instance, the merchant can utilize a payment reader that is coupled to a POS terminal to activate the debit card. In an example, the merchant can tap, dip, swipe, etc. a debit card in an inactive state via the payment reader. The payment reader can read payment data from the debit card and a POS application executing on the POS terminal can facilitate the confirmation that the payment data corresponds to the debit card. Accordingly, the debit card can be activated for use by the merchant.

Furthermore, techniques described herein are directed to personalizing the debit card. For instance, as described herein, a merchant can personalize a pattern (e.g., a signature, a Quick Response (QR) code, a photograph, a three-dimensional image, an alphanumeric code, a text, etc.), icons, and other information that can be associated with the debit card so that the debit card has a unique presentation particular to the merchant. In some examples, the signature, icons, etc. can be printed on a stock material (such as by using a laser or ink jet printer) or can be otherwise associated with the stock material via silk screening, use of stickers or labels, embossing, etching, engraving, painting and the like. Additional details are provided below.

Techniques described herein are directed to managing the movement of money through an account of a merchant. For instance, the balance applet, as described herein, can track payroll payments from the account (e.g., payments to employees of the merchant), payments to other merchants (e.g., business-to-business) directly from the account or from the linked debit card, withdrawals made via scheduled deposit and/or instant deposit, deposits from POS transactions, deposits from other bank accounts, etc. The balance applet as described herein allows merchants to access information relating to their business banking account via an integrated platform, which can be accessible via a user interface (UI) presented via a POS terminal or other merchant device.

Furthermore, techniques described herein are directed to intelligently managing authorization requests. In an example, when a payment processing service controls a payment instrument, such as a debit card linked to an account, and receives an authorization request in association with a transaction, instead of automatically declining (if account balance is below the amount of the authorization request), the payment processing service can approve the authorization request (and thus, temporarily cover the cost of the transaction) if the payment processing service believes that the ultimately charged amount will be less than or equal to the account balance. Such techniques attempt to reduce the number of declines experienced by payment instrument users, thereby decongesting networks associated with payment processing and increasing bandwidth within the payment processing network. Additional details are described below.

While the aforementioned description is directed to a debit card, as described below, techniques described herein can be directed to any type of payment instrument. Furthermore, while the aforementioned description is directed to a merchant end user, techniques described herein can apply to any type of end user. Moreover, for purposes of this discussion, an "item" can refer to any good or service that can be purchased or otherwise made available for acquisition (e.g., purchase, rent, borrow, barter, etc.) from a merchant.

FIG. 1 illustrates an example environment 100 for associating a payment instrument with an account that is managed by a payment processing service from POS transactions of a merchant and enabling the merchant to use the payment instrument for transactions with other merchants (e.g., business-to-business transactions).

In an example, a merchant 102 can operate a merchant device 104. For the purpose of this discussion, a merchant can be any entity that offers items (e.g., goods or services) for purchase or other means of acquisition (e.g., rent, borrow, barter, etc.). The merchant device 104 can have an instance of a POS application 106 stored thereon. The POS application 106 can configure the merchant device 104 as a POS terminal, which enables the merchant 102 to perform transactions with one or more customers 108. For the purpose of this discussion, such transactions can be referred to as "POS transactions" and/or "transactions." In at least one example, the POS application 106 can determine transaction data 110 associated with the POS transactions. Transaction data 110 can include payment data, which can be obtained from a reader device associated with the merchant device 104, user authentication data, purchase amount information, point-of-purchase information (e.g., item(s) purchased, date of purchase, time of purchase, etc.), etc. The POS application 106 can send transaction data 110 to one or more servers 112 of a payment processing service (or another acquirer, as described below). Furthermore, the POS application 106 can present a UI to enable merchants to interact with the POS application 106 and/or the payment processing service via the POS application 106.

The server(s) 112 can store one or more modules, including, but not limited to, a merchant module 114, a set-up module 116, and a balance management module 118. The merchant module 114 can, among other things, process transactions on behalf of the merchant 102 (and one or more other merchants). The server(s) 112 can be a cloud computing environment, a virtualized computing environment, a computer cluster, or any combination thereof.

The merchant module 114 can analyze the transaction data to determine an amount of funds owed to the merchant 102. Based on determining the amount of funds owed to the merchant 102, the merchant module 114 can send an indication to the balance management module 116 and can facilitate the deposit of such funds into an account. The account can have a stored balance 120, which can be managed by the balance management module 116. That is, the stored balance 120 can be an account managed by the payment processing service. For purposes of this discussion, "account" and "stored balance" can be used interchangeably to refer to such an account. The stored balance 120 is different from a conventional bank account at least because the stored balance 120 is managed by a ledger of a payment processing service and the associated funds are accessible via at least three withdrawal channels: instant deposit, scheduled deposit, and a linked payment instrument.

As described above, the merchant 102 can access the funds in the stored balance 120 by a scheduled deposit from the stored balance 120 to a linked bank account 122. In such an example, the server(s) 112 can initiate a deposit from the stored balance 120 managed by the server(s) 112 to the linked bank account 122 that is managed by one or more servers 124 of a bank or other financial institution. The deposit can occur at a prearranged time after a POS transaction is funded. Such scheduled deposits are often a next business day or later. In some examples, scheduled deposits are a default withdrawal channel associated with stored balances, such as the stored balance 120.

Further, the merchant 102 can access the funds in the stored balance 120 by an instant deposit from the stored balance 120 to a linked bank account 122. In such an example, the server(s) 112 can initiate a deposit from the stored balance 120 to the linked bank account 122 upon receiving a request from the merchant 102. A request for an instant deposit can be made substantially immediately after a POS transaction is funded. Instant deposits can often be associated with an additional fee due to the increased convenience of "on demand" access to the funds in the stored balance 120.

Additionally, the merchant 102 can access funds in the stored balance 120 via a payment instrument 126 that is linked to the stored balance 120. For the purpose of this discussion, a payment instrument can be "linked" such that payment data of the payment instrument can be mapped, or otherwise associated with, a stored balance. The payment instrument 126 can have an available balance (e.g., value) that corresponds to the stored balance 120.

The payment instrument 126 can be designed according to a specification corresponding to, for example, a debit card, a credit card, a smart-card (conforming to a payment instrument technical standard, such as a Europay-MasterCard-Visa ("EMV") standard), a radio frequency identification tag (i.e., near field communication enabled object), a biometric payment instrument, a virtual payment card stored on a device such as a smart phone and transmittable, for example, via near field communication ("NFC"), and can include personally identifiable information ("PII"), such as merchant name, account number, and the like. In an example, the payment instrument 126 can be a software instrument or virtual instrument which can be stored in a virtual wallet configured to initiate contactless payment transactions, e.g., a key fob, a mobile device having an RFID tag, etc. In general, the payment instrument 126 can be any kind of financial instrument that holds financial value or provides a promise to pay at a later time.

As described above, the merchant 102 can personalize the payment instrument 126. For instance, the payment instrument 126 can have embedded within, or displayed on a surface, a unique pattern corresponding to or provided by the merchant. The unique pattern, for example, can be a signature, a QR code, a photograph, a three-dimensional image, an alphanumeric code, a text, or any other pattern. The unique pattern can further comprise a placement of a signature, a QR code, a photograph, a three-dimensional image, an alphanumeric code, a text, or any other pattern on the payment instrument, for instance, relative to a chip on the payment instrument and the number of the payment instrument. Furthermore, the merchant 102 can personalize the payment instrument 126 by selecting icons and adding other flare that is representative of the merchant 102 and/or their business. For instance, as a non-limiting example, the merchant 102 can operate a coffee shop and thus can personalize the payment instrument 126 with an icon of a coffee cup. The set-up module 116 can facilitate such personalization, as described below.

The merchant 102 can use the payment instrument 126 to transact with other merchants 128, for instance via business-to-business ("B2B") transactions. That is, the merchant 102 can purchase item(s) (e.g., goods or services) from another merchant 128 and can pay for the item(s) using the payment instrument 126. The merchant 102 can use the payment instrument 126 in card present and card-not-present ("CNP") transactions (e.g., payment data associated with the payment instrument 126 is used for a transaction but the payment instrument 126 is not physically present). The balance management module 118 can receive an indication of a purchase using the payment instrument 126 and can debit an amount of the purchase from the stored balance 120. The balance management module 118 can also credit the stored balance 120 based on POS transactions, as described above, and can debit the stored balance 120 based on other payments such as payroll payments to employees, direct transfers to vendors for inventory items, scheduled and/or instant deposits, etc. Additional details associated with the ledger and the balance management module 118 are described below.

In addition to the withdrawal channels described above, funds can be withdrawn or deducted from the stored balance 120 to pay for processing fees, capital loan repayment, subscriptions, savings, bill pay, etc. That is, while three withdrawal channels are described above; funds can be withdrawn from the stored balance 120 via additional or alternative other withdrawal channels.

Figure 2:
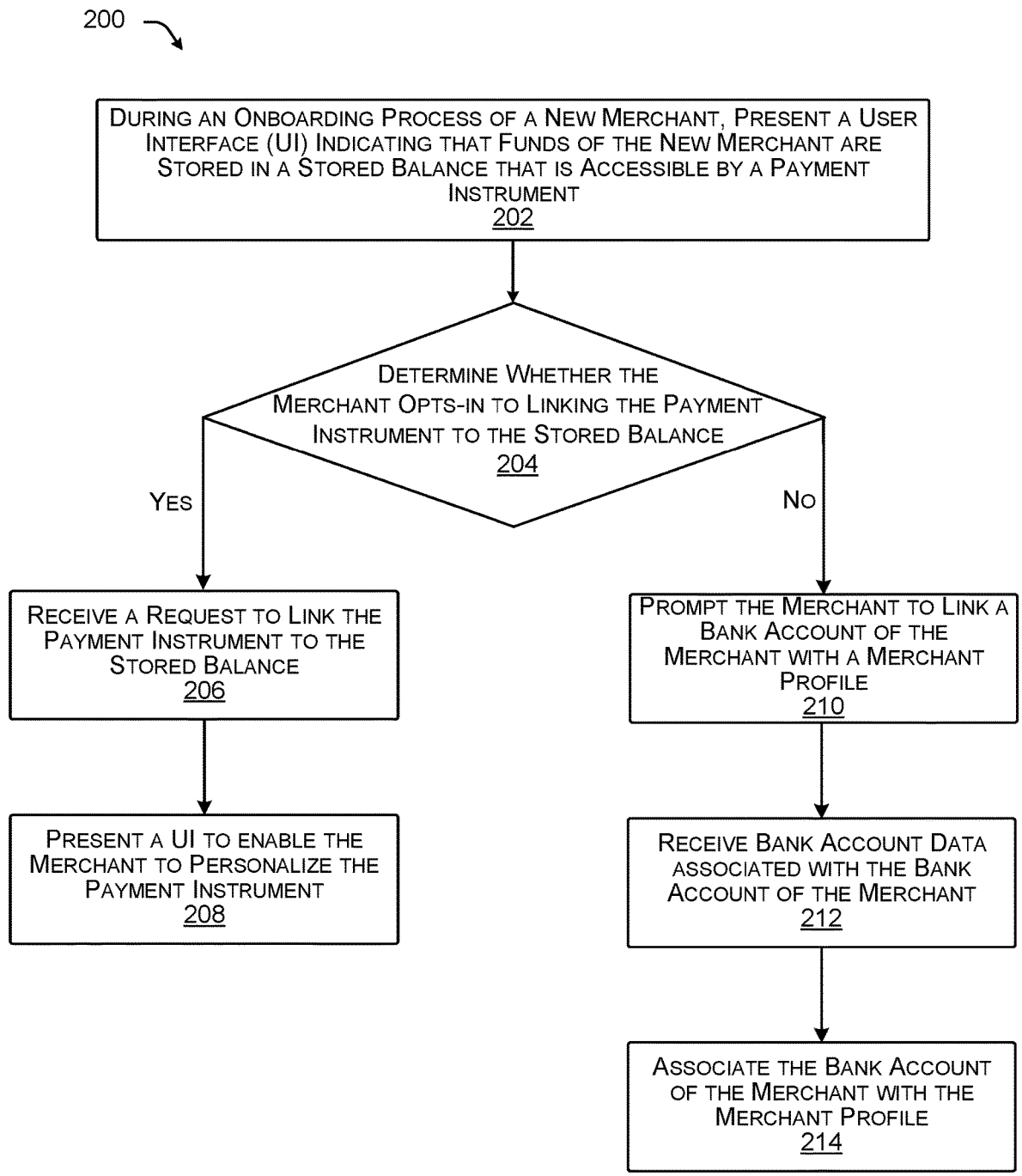
FIG. 2 illustrates an example process for associating a payment instrument with an account of a merchant during onboarding of a new merchant, as described herein.

FIG. 2 illustrates an example process 200 for associating a payment instrument with an account of a merchant during onboarding of a new merchant.

For the purpose of this discussion, onboarding can refer to registering a potential merchant with a service provider, such as a payment processing service provider (the "payment processing service"). In some examples, onboarding can involve presenting various questions, prompts, and the like to a potential merchant to obtain merchant information that can be used to generate a merchant profile for the potential merchant. Responsive to the potential merchant providing all necessary merchant information, the potential merchant can be onboarded to the payment processing service as a merchant, such as the merchant 102. In some examples, the merchant 102 can opt-in to using a payment instrument and personalizing the payment instrument during onboarding.

Block 202 illustrates, during an onboarding process of a new merchant, presenting a UI indicating that funds of the new merchant are stored in a stored balance that is accessible by a payment instrument. In at least one example, during an onboarding process, the set-up module 116 can cause a UI to be presented to the merchant 102 informing the merchant 102 that funds resulting from POS transactions processed by the payment processing service are securely stored in a stored balance 120. The UI can additionally inform the merchant 102 that the funds are available to the merchant 102 substantially immediately after funding a POS transaction via a payment instrument that can be linked to the stored balance 120. In at least one example, the UI can be presented via a web browser, or the like. In other examples, the UI can be presented via an application, such as a mobile application or desktop application, which is provided by the payment processing service, or which can be an otherwise dedicated application. For instance, the UI can be presented via the POS application 106.

Block 204 illustrates determining whether the merchant opts-in to linking the payment instrument to the stored balance. In at least one example, the merchant 102 can interact with the UI to indicate whether the merchant 102 opts-in to linking the payment instrument to the stored balance 120. For instance, the merchant 102 can select a selectable control (e.g., software or hardware button, etc.) to indicate that the merchant 102 opts-in to linking the payment instrument to the stored balance 120. Or, the merchant 102 can provide another indication that the merchant 102 opts-in to linking the payment instrument to the stored balance 120. In some examples, the payment instrument can be provided to the merchant 102 without the merchant 102 expressly opting-in to linking the payment instrument (e.g., the payment instrument can be a default option). In other examples, the merchant 102 can interact with the UI indicating that the merchant 102 opts-out of linking the payment instrument to the stored balance 120. For instance, the merchant 102 can select a selectable control associated with linking a bank account to the stored balance 120 thereby impliedly opting-out of linking the payment instrument to the stored balance 120.

Block 206 illustrates receiving a request to link the payment instrument to the stored balance. Responsive to the merchant 102 opting-in to linking the payment instrument, the set-up module 116 can receive a request to link the payment instrument to the stored balance. In at least one example, the request can be associated with merchant data such as a personal name, an address, a date of birth, a personal identifier (e.g., social security number) as received by the merchant 102 during onboarding.

Block 208 illustrates presenting a UI to enable the merchant to personalize the payment instrument. Responsive to receiving the request to link the payment instrument to the stored balance, the set-up module 116 can cause a UI to be presented to enable the merchant 102 to personalize the payment instrument. That is, the set-up module 116 can send instructions to the merchant device 104 to present the UI via a display of the merchant device 104. In at least one example, the UI can be presented via a web browser, or the like. In other examples, the UI can be presented via an application, such as a mobile application or desktop application, which is provided by the payment processing service, or which can be an otherwise dedicated application. For instance, the UI can be presented via the POS application 106.

The merchant 102 can personalize the payment instrument 126 via interaction with the UI. For instance, the payment instrument 126 can have embedded within, or displayed on a surface, a unique pattern corresponding to or provided by the merchant 102. The unique pattern, for example, can be a signature, a QR code, a photograph, a three-dimensional image, an alphanumeric code, a text, or any other pattern. The unique pattern can further comprise a placement of a signature, a QR code, a photograph, a three-dimensional image, an alphanumeric code, a text, or any other pattern on the payment instrument, for instance, relative to a chip on the payment instrument and the number of the payment instrument. Furthermore, the merchant 102 can personalize the payment instrument 126 by selecting icons and adding other flare that is representative of the merchant 102 and/or their business. The set-up module 116 can cause a UI to be presented to enable the merchant 102 to provide the unique pattern, select icon(s), etc. Additional details are provided below.

Block 210 illustrates prompting the merchant to link a bank account of the merchant to a merchant profile. If the merchant 102 does not opt-in to using the payment instrument, the set-up module 116 can prompt the merchant 102 to link a bank account of the merchant 102 to a merchant profile of the merchant 102. For instance, the set-up module 116 can send instructions to the merchant device 104 to cause a UI to be presented to the merchant 102, prompting the merchant 102 to input bank account data. In at least one example, the UI can be presented via a web browser, or the like. In other examples, the UI can be presented via an application, such as a mobile application or desktop application, which is provided by the payment processing service, or which can be an otherwise dedicated application. For instance, the UI can be presented via the POS application 106.

Block 212 illustrates receiving bank account data associated with the bank account of the merchant. The merchant 102 can input bank account data responsive to the prompt. The merchant 102 can provide at least a name of a bank, an account number, a routing number, etc. so that the merchant module 114 can deposit funds into the bank account 122 of the merchant 102.

Block 214 illustrates associating the bank account of the merchant with the merchant profile. Responsive to receiving the bank account data, the set-up module 116 can associate the bank account with a profile of the merchant 102, to which the stored balance 120 is also linked. The merchant module 114 can facilitate the deposit of funds from the stored balance 120 into the linked bank account for instance, via scheduled deposits, instant deposits, etc.

While FIG. 2 illustrates a process for linking a payment instrument 126 to a stored balance 120 of a merchant 102 during onboarding, in some examples, a merchant 102 may not link a payment instrument 126 during onboarding (e.g., the merchant 102 opted out, the linked payment instrument was not available, etc.). In such examples, the merchant 102 can link a payment instrument 126 to their stored balance 120 at a time after onboarding.

Figure 3:
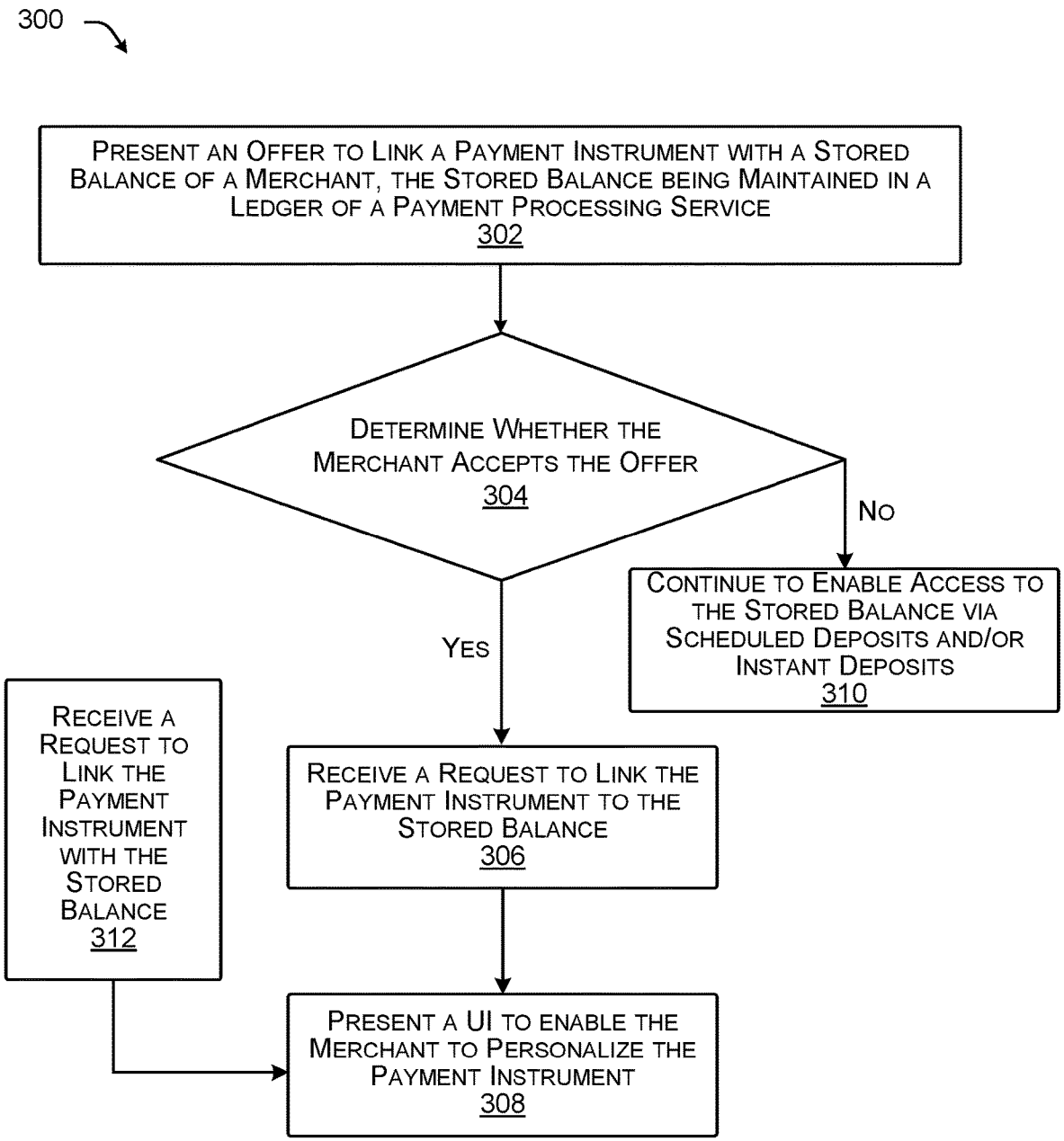
FIG. 3 illustrates an example process for linking a payment instrument to a stored balance of a merchant after onboarding of the merchant, as described herein.

FIG. 3 illustrates an example process 300 for linking a payment instrument to a stored balance of a merchant after onboarding. In such an example, the stored balance 120 can be accessible to the merchant 102 via scheduled deposits, instant deposits, etc. That is, the merchant 102 previously provided bank account information for linking their bank account to a merchant profile of the merchant 102. In such an example, until a payment instrument is linked to the stored balance 102 (and activated), the merchant module 114 can facilitate the deposit of funds from the stored balance 120 into the linked bank account for instance, via scheduled deposits, instant deposits, etc.

Block 302 illustrates presenting an offer to link a payment instrument with a stored balance of a merchant, the stored balance being maintained in a ledger of a payment processing service. In at least one example, the set-up module 116 can send an offer to link a payment instrument with a stored balance to a device of a merchant. For instance, the set-up module 116 can send an email, text message, push notification, etc. to the merchant device 104. The offer can explain details associated with linking a payment instrument to the stored balance 120 and can include a selectable control that enables the merchant 102 to initiate a request to link the payment instrument to the stored balance 120. In another example, the set-up module 116 can cause a selectable control to be presented via a dashboard presented via a webpage, the POS application 106, etc. For the purpose of this discussion, a dashboard can be a UI that provides an at-a-glance view of key information (e.g., associated with transactions, payments, etc.). Selection of the selectable control can initiate a request to link the payment instrument to the stored balance 120. In additional or alternative examples, another mechanism can be used to enable a merchant to indicate acceptance (or not) of the offer.

Block 304 illustrates determining whether the merchant accepts the offer. The set-up module 116 can receive an indication that the merchant 102 accepts the offer (e.g., by selection of a selectable control presented via an email, text message, push notification, dashboard, etc.). Block 306 illustrates receiving a request to link the payment instrument to the stored balance. Responsive to the merchant 102 opting-in to linking the payment instrument (e.g., accepting the offer), the set-up module 116 can receive a request to link the payment instrument to the stored balance.

Block 308 illustrates presenting a UI to enable the merchant to personalize the payment instrument. Responsive to receiving the request to link the payment instrument to the stored balance, the set-up module 116 can cause a UI to be presented to enable the merchant 102 to personalize the payment instrument. That is, the set-up module 116 can send instructions to the merchant device 104 to present the UI via a display of the merchant device 104. In at least one example, the UI can be presented via a web browser, or the like. In other examples, the UI can be presented via an application, such as a mobile application or desktop application, which is provided by the payment processing service, or which can be an otherwise dedicated application. For instance, the UI can be presented via the POS application 106. The merchant 102 can personalize the payment instrument 126 via interaction with the UI, as described above.

Block 310 illustrates continuing to enable access to the stored balance via scheduled deposits and/or instant deposits. If the merchant 102 does not accept the offer, the merchant module 114 can continue to enable access to the stored balance 120 via scheduled deposits and/or instant deposits to the linked bank account.

In some examples, the merchant 102 can initiate a request to link the payment instrument with the stored balance (e.g., without first having received an offer), as illustrated in block 312.

In at least one example, as part of the ordering process—which can be associated with onboarding or at a later time as described above—the merchant 102 can input and/or confirm merchant information including, but not limited to, a shipping address (indicating where to ship the payment instrument 126), an account owner (e.g., which can be associated with the payment instrument 126), a business name (e.g., which can be associated with the payment instrument 126 and/or can appear on receipts and customer statements), a date of birth, a zip code, etc. Furthermore, in some examples, responsive to completing the ordering process (and prior to receipt and/or activation of the payment instrument 126), the merchant 102 can utilize the payment data associated with the payment instrument 126 to perform CNP transactions. That is, upon completion of the personalization process, the set-up module 116 can cause a UI to be presented that provides the merchant 102 with the payment data, or a portion thereof, and the merchant 102 can use the payment data for CNP transactions. In some examples, the merchant 102 cannot use the payment instrument 126 for CNP transactions until after the payment instrument 126 is activated.

FIGS. 4 and 5 illustrate non-limiting examples of UIs that can be presented consistent with techniques described herein. In at least one example, the UI can be presented via a web browser, or the like. In other examples, the UI can be presented via an application, such as a mobile application or desktop application, which is provided by the payment processing service, or which can be an otherwise dedicated application. For instance, the UI can be presented via the POS application 106. It should be noted that the UIs described can present additional or alternative content in additional or alternative configurations.

FIG. 4 illustrates an example UI 400 from which a merchant can send a request to link a payment instrument with a stored balance of the merchant. As described above, in an example, the set-up module 116 can cause a selectable control 402 to be presented via a dashboard 404 presented via a webpage, the POS application 106, etc. In some examples, the selectable control 402 can be presented in association with an offer. Selection of the selectable control 402 can initiate a request to link the payment instrument to the stored balance 120. In some examples, the UI 400 can include a selectable control 406 to enable the merchant 102 to initiate a transfer of funds (e.g., via an instant or scheduled deposit) to the merchant's bank account 122. Additional details associated with the UI 404 are described below.

As described above, the merchant 102 can personalize the payment instrument 126. For instance, the payment instrument 126 can have embedded within, or displayed on a surface, a unique pattern corresponding to or provided by the merchant 102. The unique pattern, for example, can be a signature, a QR code, a photograph, a three-dimensional image, an alphanumeric code, a text, or any other pattern. The unique pattern can further comprise a placement of a signature, a QR code, a photograph, a three-dimensional image, an alphanumeric code, a text, or any other pattern on the payment instrument, for instance, relative to a chip on the payment instrument and the number of the payment instrument.

Furthermore, the merchant 102 can personalize the payment instrument 126 by selecting icons and adding other flare that is representative of the merchant 102 and/or their business. The set-up module 116 can cause a UI to be presented to enable the merchant 102 to provide the unique pattern, select icon(s), etc. FIG. 5 illustrates an example UI 500 from which a merchant can personalize their payment instrument.

As illustrated in FIG. 5, the merchant 102 can provide a unique pattern via an interaction with the UI 500, for instance, by signing in a signature box 502 presented via the UI 500. In such an example, the merchant 102 selects or provides a signature and the POS application 106, for example, can send the signature to the set-up module 116. The set-up module 116 receives the signature and converts and/or encrypts the signature into a pattern, which is capable of being imprinted, embedded or otherwise associated with the payment instrument.

In some examples, the UI 500 can present push notifications or messages to the merchant 102, such as "system is ready to accept your signature. Do you want a select an image as a signature or provide your own?" with attached actions (e.g., "Yes, provide me options" to show pre-selection options for the merchant to select, or "Provide my own") for providing a custom signature which can be an image or text or a combination of both, and so on.

As used herein, the term "unique pattern" is a unique identifier that can either be provided by a merchant by keying in their preferred unique pattern on a merchant UI, such as touch screen or keypad or by selecting from amongst a list of options generated by the server(s) 112 (e.g., the set-up module 116). In another example, the set-up module 116 can automatically and/or randomly assign a unique pattern to the merchant 102 at the time of account creation. As described above, the unique pattern can be a signature, alphanumeric text, a shape, an image, a barcode, a QR code, a radio frequency identifier (RFID) tag, and so on.

The unique pattern is referenced as being associated with or printed on the payment instrument, however, the unique pattern can be provided with the payment instrument, for example in an accompanying letter. The unique pattern can also be embedded, such that it is hidden to naked eye. The unique pattern once encrypted and printed or associated to the payment instrument can be mentioned as pattern in the specification. The unique pattern can also be an analog of a digital file that comprises a picture or a drawing that is in a JPEG or other file format.

Further, the merchant 102 can select one or more icons 502 via interaction with the UI 500. In an example, a merchant 102 can provide a touch input to select an icon corresponding to a position of the touch input. In some examples, the icon(s) 502 can be arranged in an order based on a characteristic of the merchant 102, as described below with reference to FIG. 6. In an example, the merchant 102 selects an icon and the POS application 106, for example, can send the selected icon, or an indication of such, to the set-up module 116. The set-up module 116 receives the icon, or the indication of such, and converts and/or encrypts the icon into an icon which is capable of being imprinted, embedded or otherwise associated with the payment instrument.

The icon(s) 502 are referenced as being associated with or printed on the payment instrument; however, the icon(s) 502 can be provided with the payment instrument, for example in an accompanying letter. The icon(s) 502 can also be embedded, such that they are hidden to naked eye. The icon(s) 502 once encrypted and printed or associated to the payment instrument can be mentioned as pattern in the specification. An icon can also be an analog of a digital file that comprises a picture or a drawing that is in a JPEG or other file format.

It should be noted that in some examples, the unique pattern and/or selected icon(s) can be reviewed manually or by an automated system to determine whether the unique pattern and/or selected icon(s) are compliant with terms of service or other standards imposed by the payment processing service. In an example where a unique pattern and/or selected icon(s) are rejected, the merchant 102 can be notified and can be presented with a UI to enable the merchant 102 to reorder a payment instrument that complies with the terms of service or other standards.

In FIG. 5, a non-limiting example of a personalized payment instrument 126 is provided.

A variety of materials can be used to craft the payment instrument 126. For example, the payment instrument 126 can be crafted of stock materials, such as plastics, paper, laminates, and the like. According to the stock material used to construct the payment instrument 126, a number of techniques can be used to associate the unique pattern and/or icon(s) with the payment instrument 126. For instance, the unique pattern and/or icon(s) can be printed on the stock material (such as by using a laser or ink jet printer). Other examples include silk screening, use of stickers or labels, embossing, etching, engraving, painting and the like. In some cases, the stock material can have some information already included, such as a company logo, legal notices, and the like, or this information can be placed onto the stock material at the time the unique pattern and/or icon(s) are placed onto the stock material.

In addition to providing the unique pattern and/or icon(s) on the payment instrument 126, some or all of the unique pattern and/or icon(s) can be placed in portions, for example a first portion on one side and the second portion on the other side of the payment instrument 126. The activation then involves reading the image in two parts and in a specific order. The unique pattern and/or icon(s) can also be printed onto other materials as well. For example, the unique pattern and/or icon(s) can be provided on any inserts mailed with the payment instrument 126, the envelope or mailer, and the like.

A wide variety of techniques can be used to deliver the payment instrument 126 to the merchant 102 after it has been created. For example, the payment instrument 126 could be attached to a card carrier and placed into a mailer along with any other inserts. This can then be mailed to the merchant 102. Other techniques include personal delivery, by courier services, by in-store pick-up and the like. The payment instrument 126 can also be produced at a location of the merchant 102 (e.g., a brick and mortar).

As described herein, the payment instrument 126 can be in an inactive state until activated by the merchant 102. In this way, if the payment instrument 126 is intercepted or stolen before reaching the merchant 102, it may not be used. One way to activate the payment instrument 126 is to require certain information to be supplied to the payment processing service (or other authentication service) by the merchant 102. This information can be input by the merchant 102 and then transmitted to the payment processing service (or other authentication service), such as by e-mail, by a phone call, by a separate mailing, or the like. Instead of expecting the merchant 102 to provide his or her phone number to activate the account and then calling, the payment instrument 126 described herein can include the unique pattern and/or icon(s) having activation capabilities. The unique pattern and/or icon(s) can trigger the activation process without the merchant 102 having to reach out to a representative of the payment processing service. As such, the process of activation is not just automated but also initiated by a feature on the payment instrument 126 that is otherwise inactive and merely ornamental and design related. Additional details associated with activating the payment instrument 126 are described below.

Figure 6:
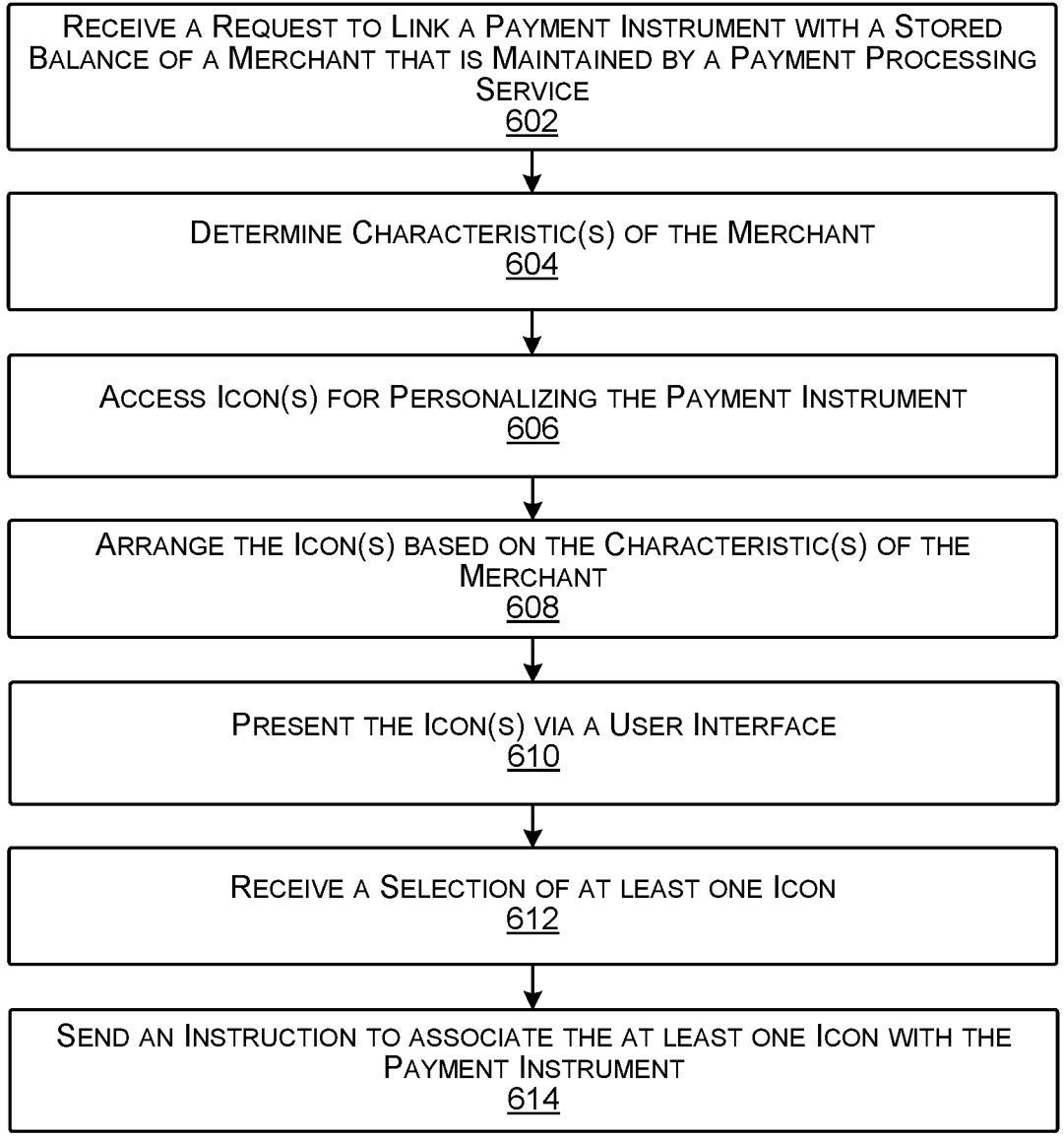
FIG. 6 illustrates an example process for personalizing a payment instrument, as described herein.

FIG. 6 illustrates an example process 600 for personalizing a payment instrument.

Block 602 illustrates receiving a request to link a payment instrument with a stored balance of a merchant that is maintained by a payment processing service. In at least one example, the set-up module 116 can receive a request to link a payment instrument with the stored balance 120 of the merchant 102. In some examples, the set-up module 116 can receive the request during onboarding of the merchant, responsive to an offer from the payment processing service, etc., as described above.

Block 604 illustrates determining characteristic(s) of the merchant. In at least one example, the set-up module 116 can determine characteristic(s) of the merchant 102. As described above, the merchant 102 can be associated with a merchant profile, that can be stored in a database associated with the server(s) 112. In at least one example, the merchant profile can store information associated with the merchant 102. For instance, the merchant profile can store merchant data including, but not limited to, a merchant category classification ("MCC"), item(s) offered for sale by the merchant, transaction data associated with transactions conducted by the merchant (e.g., via the POS application 106), hardware (e.g., device type) used by the merchant, previous loans made to the merchant, previous defaults on said loans, an indication of risk (e.g., based at least in part on fraud, chargeback, etc.) associated with the merchant, etc. The merchant profile can securely store bank account information as provided by the merchant. Further, the merchant profile can store payment data associated with a payment instrument linked to a stored balance 120 of the merchant 102, and data associated with the stored balance 120. In such an example, the set-up module 116 can access a profile associated with the merchant 102 to determine the characteristic(s).

If a merchant is new merchant (e.g., onboarding), the set-up module 116 can access merchant data as input from the merchant during onboarding. For instance, such a merchant can input an MCC, an address, inventory item(s), etc.

Block 606 illustrates accessing icon(s) for personalizing the payment instrument. In at least one example, the server(s) 112 can store a database of icon(s) that can be used for personalizing the payment instrument. In an additional or alternative example, a merchant can upload or otherwise provide icon(s) for personalizing the payment instrument. Further, in some examples, the set-up module 116 can access icon(s) via third-party service provider(s).

Block 608 illustrates arranging the icon(s) based on the characteristic(s) of the merchant. In at least one example, the set-up module 116 can determine an order for presenting the icon(s) based on the characteristic(s) of the merchant 102. For instance, the set-up module 116 can determine that a first icon that is more relevant to the merchant 102, as determined by the characteristic(s) of the merchant 102, should be presented to the merchant 102 prior to a second icon that is less relevant to the merchant 102. As a non-limiting example, if the merchant is a coffee café, the set-up module 116 can prioritize icons related to coffee and/or café s over icons that are related to home repair services or retail services.

Block 610 illustrates presenting the icon(s) via a UI. The set-up module 116 can cause the icon(s) to be presented via a UI. A non-limiting example of such a UI is provided above with reference to FIG. 5. By intelligently ordering icons, techniques described herein enable improved user interaction with the UI. That is, the merchant 102 does not need to sort through various irrelevant icons and, instead, can view icon(s) that are most relevant to the merchant 102 prior to viewing icon(s) that are less relevant to the merchant 102.

Block 612 illustrates receiving a selection of at least one icon. As described above, the set-up module 116 can receive an indication of a selection of at least one icon. For instance, the merchant 102 can interact with the UI (e.g., touch input, spoken input, click, etc.) to select one or more of the icons and the POS application 106 can send an indication of such selections to the set-up module 116.

Block 614 illustrates sending an instruction to associate at least one icon with the payment instrument. Responsive to receiving the indication of the selection, the set-up module 116 can generate an instruction associated with the configuration of the payment instrument. The set-up module 116 can send the instruction to a computing device, which can execute the instructions and generate the personalized payment instrument. A non-limiting example of a payment instrument 126 is provided above with reference to FIG. 5. As described above with reference to FIG. 5, a number of techniques can be used to associate the icon(s) with the payment instrument 126. For instance, the icon(s) can be printed on the stock material (such as by using a laser or ink jet printer). Other examples include silk screening, use of stickers or labels, embossing, etching, engraving, painting and the like.

Once the payment instrument 126 is delivered to the merchant 102, the merchant 102 initiates a process to activate the payment instrument 126. For this, a mobile device, for example the merchant device 104, can execute a self-guiding tool or provide a personalized flow to walk the merchant 102 through the steps of activating the payment instrument 126. The merchant 102 can select or provide information in response to queries that are tailored to the merchant 102. For example, one of the steps can direct the merchant 102 to take an image or a portion of the image of the pattern on the payment instrument 126 through a sensor, such as a camera, of the merchant device 104. The merchant device 104, an application executing thereon (e.g., the POS application 106), or the payment processing service (e.g., the server(s) 112) that receives the image, then decrypts and compares the image with unique patterns stored at the time of registration. If a stored pattern matches the captured image, the payment processing service can authorize the payment instrument 126 to be used for purchases, as described above. However, if the captured image does not match a stored pattern, the payment instrument 126 is not activated, as there is an increased likelihood that the authorization attempt is fraudulent.

Figure 7:
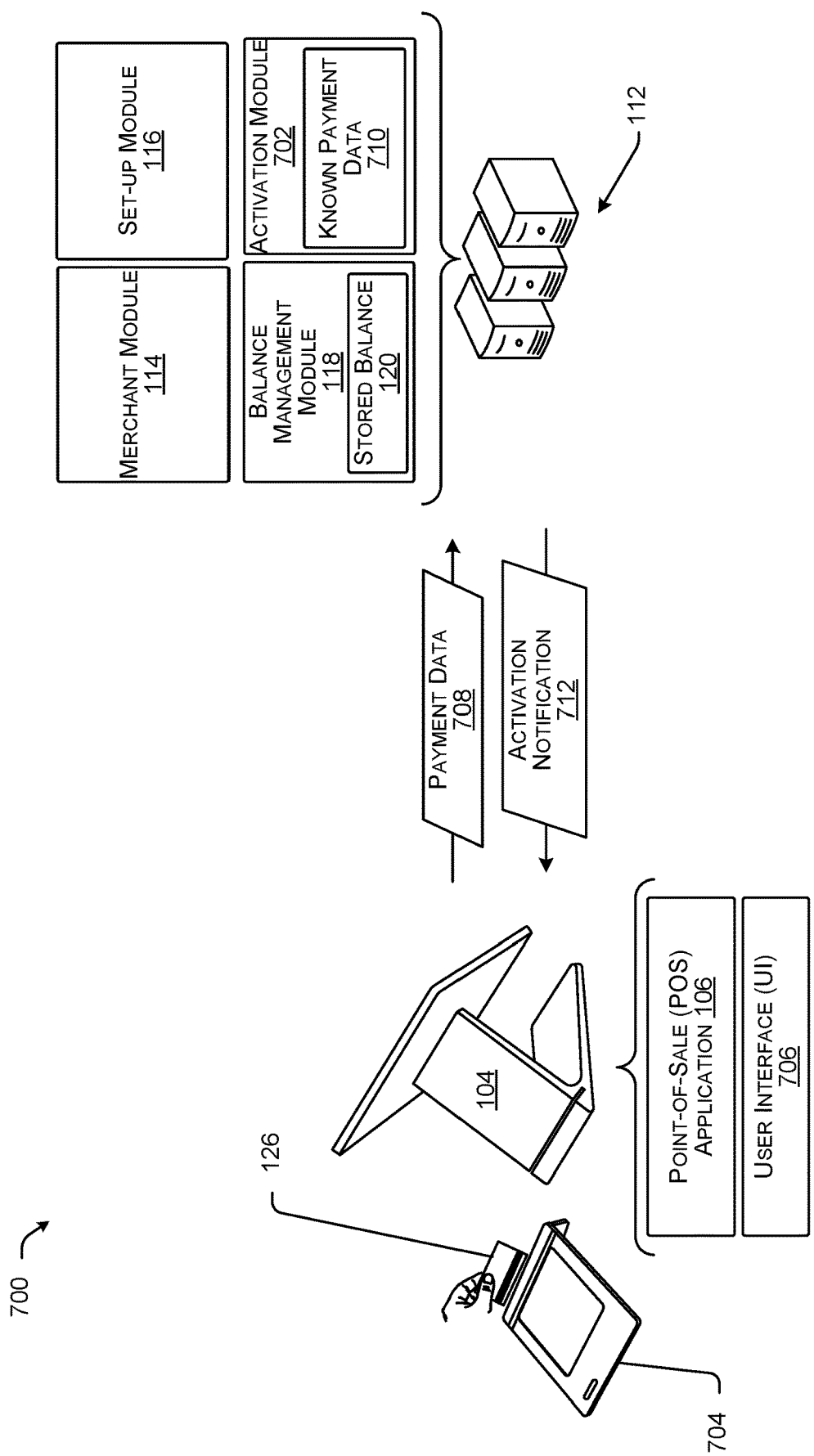
FIG. 7 illustrates an example environment for activating a payment instrument, as described herein.
Figure 8:
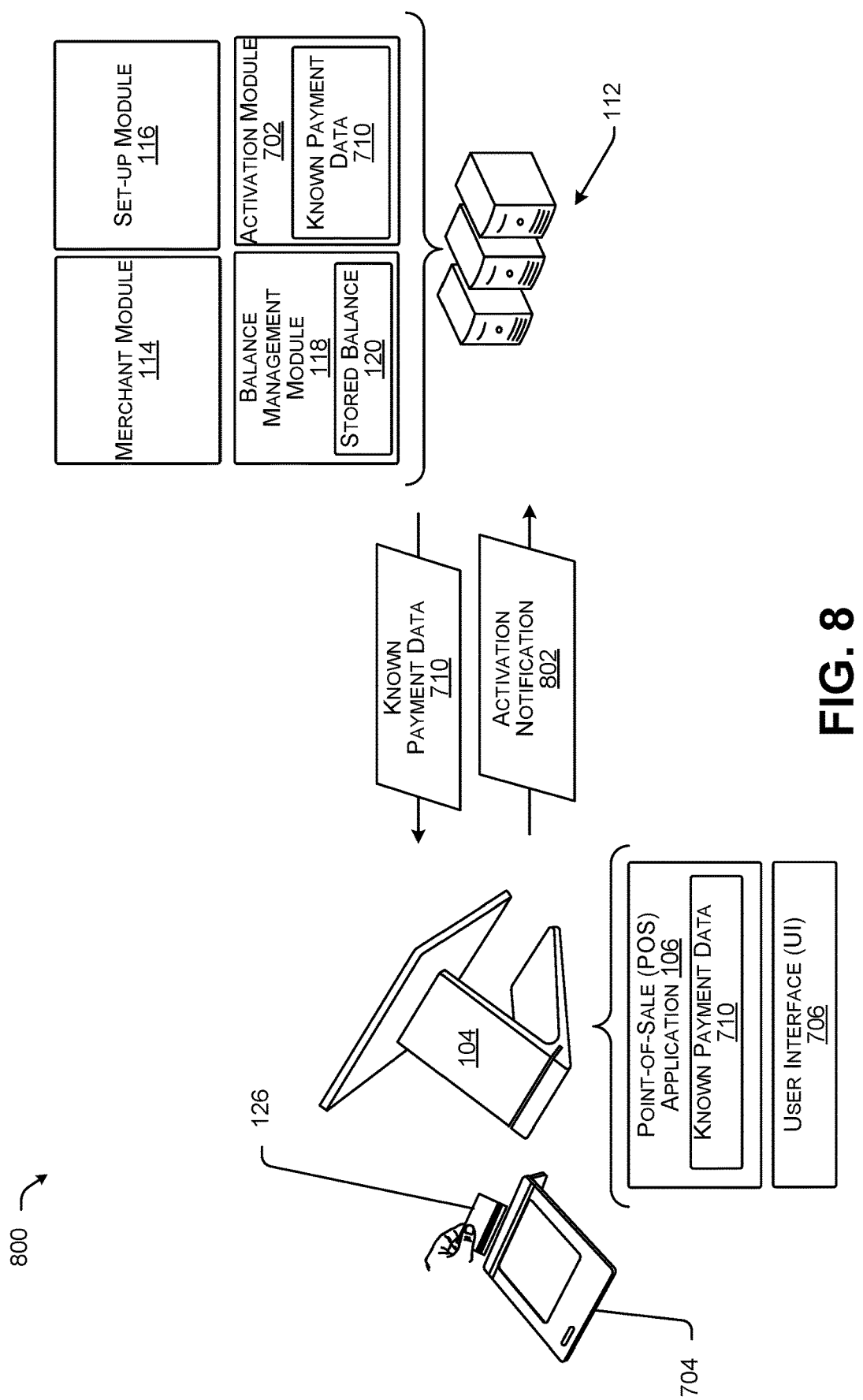
FIG. 8 illustrates another example environment for activating a payment instrument, as described herein.
Figure 9:
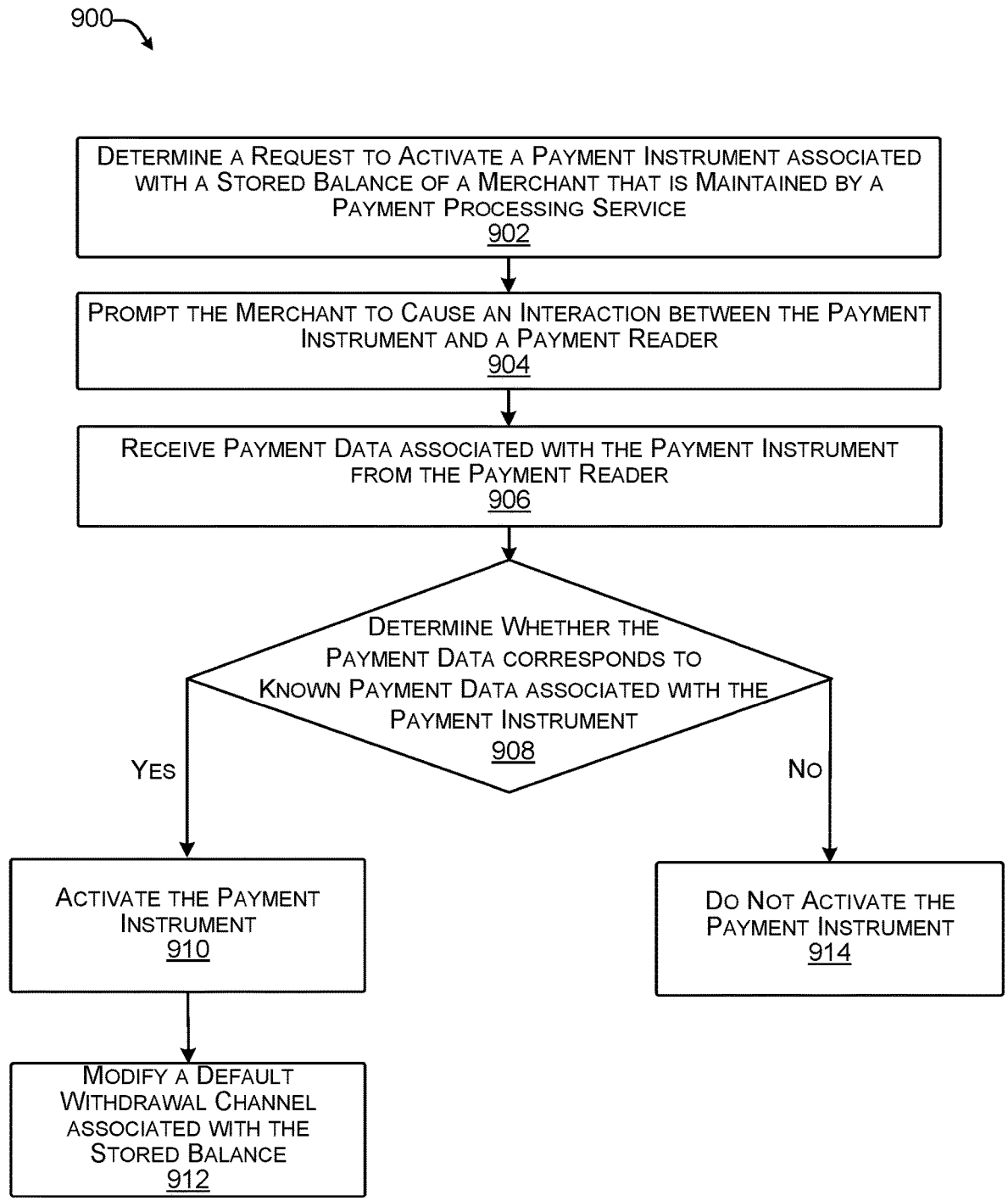
FIG. 9 illustrates an example process for activating a payment instrument, as described herein.

Additionally, in at least one example, the merchant 102 can utilize a payment reader that is coupled to the merchant device 104 to activate the payment instrument 126. In an example, the merchant 102 can insert the payment instrument 126, which is in an inactive state, into the payment reader. Additionally or alternatively, the merchant 102 can dip or tap the payment instrument 126 to the payment reader to activate the payment instrument 126. The payment reader can read payment data from the payment instrument 126 and the POS application 106 can facilitate the confirmation that the payment data corresponds to the payment instrument 126 and activation of the payment instrument 126. Accordingly, the payment instrument 126 can be activated for use by the merchant 102. FIGS. 7-9 are directed to such activation techniques. In the context of payment instruments, the word "activate" can mean: (a) confirming that the merchant in possession of the payment instrument is the intended merchant; (b) confirming that the payment instrument has been securely received by the intended merchant; (c) registering the payment instrument with the payment processing service so that the intended merchant can use the payment instrument towards financial transactions; (d) associating the payment instrument with the identity of the merchant through a registration process; (e) enabling security measures and providing financial protection to the merchant from the time the payment instrument is activated; and/or (0 agreeing to the terms and conditions of the payment processing service or any other entity issuing the payment instrument.

FIGS. 7 and 8 illustrate two example environments 700 and 800, respectively, for activating a payment instrument.

FIGS. 7 and 8 include various components of the environment 100, as described above with respect to FIG. 1. Some components of the environment 100 are omitted for clarity. In FIGS. 7 and 8, the server(s) 112 additionally include an activation module 702. The activation module 702 can, among other things, perform one or more functions to activate the payment instrument 126.

Additionally, in FIGS. 7 and 8, a payment reader 704 is depicted as part of the environments 700 and 800. The payment reader 704 can physically interact with payment instruments such as magnetic stripe payment cards, EMV payment cards, and short-range communication (e.g., near field communication ("NFC"), radio frequency identification ("RFID"), Bluetooth®, Bluetooth® low energy ("BLE"), etc.) payment instruments. In some examples, the payment reader 704 can plug in to a port in the merchant device 104, such as a microphone/headphone port, a data port, or other suitable port. The payment reader 704 can be a portable magnetic stripe card reader, optical scanner, smartcard (card with an embedded IC chip) reader (e.g., an EMV-compliant card reader or short-range communication enabled reader), RFID reader, or the like, configured to detect and obtain data off any payment instrument. Accordingly, the payment reader 704 can include hardware implementation, such as slots, magnetic tracks, and rails with one or more sensors or electrical contacts to facilitate detection and acceptance of a payment instrument 126. In FIGS. 7 and 8, the payment reader 704 is illustrated as being integrated in a customer-facing device that is coupled to the merchant device 104. It should be noted, however, that any payment reader that is capable of reading payment data from a payment instrument can be used. That is, in additional or alternative examples, the payment reader 704 can be integrated into the merchant device 104, connectable to the merchant device 104, etc.

In at least one example, the merchant 102 can interact with a UI 706 for activating the payment instrument 126. In at least one example, the UI 706 can be presented via a web browser, or the like. In other examples, the UI 706 can be presented via an application (e.g., mobile or desktop) or applet, which is provided by the payment processing service, or which can be an otherwise dedicated application or applet. For instance, the UI 706 can be presented via the POS application 106 or an applet (e.g., a balance applet, described below) associated with the POS application 106. In some examples, the merchant 102 can log in to their payment processing service account (e.g., which corresponds to a merchant profile of the merchant 102) via the POS application 106 to access the UI 706. In at least one example, the UI 706 can include a selectable control that when selected initiates an activation process. In some examples, the selectable control can be made available via a status check of an ordered payment instrument. That is, the merchant 102 can interact with the UI 706 to check the status of their ordered payment instrument 126 and, when the payment instrument 126 is ready for activation, the selectable control can be availed to the merchant 102. The merchant 102 can indicate a desire to activate the payment instrument 126, for instance via selection of the selectable control. In another example, the merchant 102 can provide a voice input indicating that the merchant 102 desires to activate the payment instrument 126.

In at least one example, the POS application 106 can prompt (e.g., via the UI 706) the merchant 102 to cause an interaction (e.g., a dip, tap, or swipe) between the payment instrument 126 and the payment reader 704. The merchant 102 can cause the payment instrument 126 to interact with the payment reader 704. Responsive to such an interaction, the payment reader 704 can read payment data 708 from the payment instrument 126. The payment data 708 can include, but is not limited to, a name of the merchant 102, an address of the merchant 102, a type (e.g., credit, debit, etc.) of a payment instrument 126 from which the payment data is accessed, a number associated with the payment instrument 126, a verification value (e.g., PIN Verification Key Indicator ("PVKI"), PIN Verification Value ("PVV"), Card Verification Value ("CVV"), Card Verification Code ("CVC"), etc.) associated with the payment instrument 126, an expiration date associated with the payment instrument 126, a primary account number ("PAN") corresponding to the merchant 102 (which can or may not match the number associated with the payment instrument 126), restrictions on what types of charges/debts can be made, etc. In some examples, the payment data 708 can be encrypted. The POS application 106 can send the payment data 708 to the activation module 702.

In at least one example, as illustrated in FIG. 7, the activation module 702 can receive payment data 708 from the POS application 106 and can compare the payment data 708 to known payment data 710 associated with the payment instrument 126 provided to the merchant 126. Known payment data 710 can include, but is not limited to, a name of the merchant 102, an address of the merchant 102, a type (e.g., credit, debit, etc.) of a payment instrument 126 from which the payment data is accessed, a number associated with the payment instrument 126, a verification value (e.g., PVKI, PVV, CVV, CVC, etc.) associated with the payment instrument 126, an expiration date associated with the payment instrument 126, a PAN corresponding to the merchant 102 (which can or may not match the number associated with the payment instrument 126), restrictions on what types of charges/debts can be made, etc. In some examples, the known payment data 710 can be stored in the activation module 702.

Upon determining that the payment data 708 matches, or otherwise corresponds to, at least a portion of the known payment data 710, the activation module 702 can send an activation notification 712 to the POS application 106. The activation notification 712 can provide a notification to the merchant 102 that the payment instrument 126 is activated. In at least one example, the activation notification 712 can be presented via the UI 706. In some examples, responsive to activating the payment instrument 126, the activation module 702 can modify the default withdrawal channel associated with the stored balance 120. For example, in some instances, until a payment instrument is linked to a stored balance, scheduled deposits can be the default withdrawal channel. However, upon activation of a payment instrument, the activation module 702 can change the default withdrawal channel to the payment instrument, thereby allowing the stored balance 120 to increase. In such an example, the activation module 702 can send an indication to the merchant module 114 and/or the balance management module 118 to temporarily freeze or deactivate scheduled or instant deposits. Accordingly, funds from POS transactions can be stored in the stored balance 120 instead of being deposited into a linked bank account of the merchant 102 per a predetermined schedule (e.g., so the stored balance 120 has funds to be spent via use of the payment instrument 126). In at least one example, the activation module 702 can send a notification to the POS application 106 to notify the merchant 102 of this modification. Such a notification can be presented via the UI 706. In some examples, such a notification can be sent with the activation notification.

In an alternative example, as illustrated in FIG. 8, the activation module 702 can provide the known payment data 710 to the POS application 106, for example, at some time prior to activation of the payment instrument 126. In such an example, the POS application 106 can temporarily store the known payment data 710. As described above, the merchant 102 can interact with the UI 706 or otherwise indicate a desire to activate the payment instrument 126. The POS application 106 can prompt the merchant 102 to cause an interaction (e.g., a dip, tap, or swipe) between the payment instrument 126 and the payment reader 704. The merchant 102 can cause the payment instrument 126 to interact with the payment reader 704. Responsive to such an interaction, the payment reader 704 can read payment data 708 from the payment instrument 126. The POS application 106 can compare the payment data 708 to the known payment data 710. Upon determining that the payment data 708 matches, or otherwise corresponds to, at least a portion of the known payment data 710, the POS application 106 can send an activation notification 802 to the activation module 702. The activation notification 802 can provide a notification to the activation module 702 that the payment instrument 126 is activated. In some examples, responsive to receiving the activation notification 802, the activation module 702 can indicate such and can modify the default withdrawal channel associated with the stored balance 120. In at least one example, the activation module 702 can send a notification to the POS application 106 to notify the merchant 102 of this modification. Such a notification can be presented via the UI 706.

While unconventional techniques directed to swipe (or dip, tap) to activate are described above, the payment instrument 126 can be activated in more traditional ways as described above. Additionally or alternatively, the merchant 102 can log into their payment processing service account via the POS application 106, enter one or more data items of the payment data associated with the payment instrument 126 (e.g., a verification value (e.g., PVKI, PVV, CVV, CVC, etc.) associated with the payment instrument 126, an expiration date associated with the payment instrument 126, a PAN corresponding to the merchant 102) to activate the payment instrument 126. Other means for activating the payment instrument 126 are described above.

In at least one example, the activation module 702 can facilitate a two-factor authentication ("TFA") process whereby, prior to activating the payment instrument 126, the activation module 702 can send a communication (e.g., a text message, an email, a push notification, etc.) to an address (e.g., phone number, email address, etc.) associated with the merchant profile corresponding to the merchant 102 to verify that the authorized user (e.g., the merchant 102) agrees to activate the payment instrument 126. In at least one example, the communication can include a code or other identifier. In such an example, the activation module 702 can refrain from activating the payment instrument 126 until the merchant 102 replies to the communication, for instance by providing the code or other identifier provided via the communication. In some examples, the merchant 102 can provide the code or other identifier via the UI 706. The POS application 106 can send the code or other identifier to the activation module 702, and so long as the code or other identifier provided corresponds to the code or other identifier sent in the communication, the activation module 702 can activate the payment instrument 126.

In some examples, responsive to activating the payment instrument, the UI 706 can present a prompt for the merchant 102 to select or input a personal identification number ("PIN"). The UI 706 can send the PIN to the activation module 702, which can associate the PIN with the payment instrument 126 and/or a merchant profile corresponding to the merchant 102. In at least one example, the merchant 102 can set a PIN at a later time, after activation of the payment instrument 126.

In view of the foregoing, examples described herein provide specific technical improvements over conventional methods with streamlined automation and enhanced security functionality in activating a payment instrument.

FIG. 9 illustrates an example process 900 for activating a payment instrument.

Block 902 illustrates determining a request to activate a payment instrument associated with a stored balance of a merchant that is maintained by a payment processing service. In at least one example, the merchant 102 can interact with a UI 706 for activating the payment instrument 126. In at least one example, the UI 706 can be presented via a web browser, or the like. In other examples, the UI 706 can be presented via an application, such as a mobile application or desktop application, which is provided by the payment processing service, or which can be an otherwise dedicated application. For instance, the UI 706 can be presented via the POS application 106 or an applet (e.g., a balance applet, described below) associated with the POS application 106.

In some examples, the merchant 102 can log in to their payment processing service account (e.g., which corresponds to a merchant profile) via the POS application 106 to access the UI 706. In at least one example, the UI 706 can include a selectable control that when selected initiates an activation process. In some examples, the selectable control can be made available via a status check of an ordered payment instrument. That is, the merchant 102 can interact with the UI 706 to check the status of their ordered payment instrument 126 and, when the payment instrument 126 is ready for activation, the merchant 102 the selectable control can be availed to the merchant 102. The merchant 102 can indicate a desire to activate the payment instrument 126, for instance via selection of the selectable control. In another example, the merchant 102 can provide a voice input indicating that the merchant 102 desires to activate the payment instrument 126. In such examples, the POS application 106 can determine a request to active a payment instrument. In some examples, the POS application 106 can send the request to the activation module 702.

Block 904 illustrates prompting the merchant to cause an interaction between the payment instrument and the payment reader. In at least one example, the POS application 106 can prompt (e.g., via the UI 706) the merchant 102 to cause an interaction (e.g., a dip, tap, or swipe) between the payment instrument 126 and the payment reader 704.

Block 906 illustrates receiving payment data associated with the payment instrument from the payment reader. The merchant 102 can cause the payment instrument 126 to interact with the payment reader 704. Responsive to such an interaction, the payment reader 704 can read payment data 708 from the payment instrument 126. The payment data 708 can include, but is not limited to, a name of the merchant 102, an address of the merchant 102, a type (e.g., credit, debit, etc.) of a payment instrument 126 from which the payment data is accessed, a number associated with the payment instrument 126, a verification value (e.g., PVKI, PVV, CVV, CVC, etc.) associated with the payment instrument 126, an expiration date associated with the payment instrument 126, a PAN corresponding to the merchant 102 (which can or may not match the number associated with the payment instrument 126), restrictions on what types of charges/debts can be made, etc. In some examples, the payment data 708 can be encrypted. In some examples, the POS application 106 can send the payment data 708 to the activation module 702.

Block 908 illustrates determining whether the payment data corresponds to known payment data associated with the payment instrument. In at least one example, as illustrated in FIG. 7, the activation module 702 can receive payment data 708 from the POS application 106 and can compare the payment data 708 to known payment data 710 associated with the payment instrument 126 provided to the merchant 126. Known payment data 710 can include, but is not limited to, a name of the merchant 102, an address of the merchant 102, a type (e.g., credit, debit, etc.) of a payment instrument 126 from which the payment data is accessed, a number associated with the payment instrument 126, a verification value (e.g., PVKI, PVV, CVV, CVC, etc.) associated with the payment instrument 126, an expiration date associated with the payment instrument 126, a PAN corresponding to the merchant 102 (which can or may not match the number associated with the payment instrument 126), restrictions on what types of charges/debts can be made, etc. In some examples, the known payment data 710 can be stored in the activation module 702.

In an alternative example, as illustrated in FIG. 8, the activation module 702 can provide the known payment data 710 to the POS application 106 at some time prior to activation of the payment instrument 126. In such an example, the POS application 106 can temporarily store the known payment data 710. In such an example, the payment reader 704 can read payment data 708 from the payment instrument 126. The POS application 106 can compare the payment data 708 to the known payment data 710.

Block 910 illustrates activating the payment instrument. In at least one example, such as the example described above with reference to FIG. 7, upon determining that the payment data 708 matches, or otherwise corresponds to, at least a portion of the known payment data 710, the activation module 702 can send an activation notification 712 to the POS application 106. The activation notification 712 can provide a notification to the merchant 102 that the payment instrument 126 is activated. In at least one example, the activation notification 712 can be presented via the UI 706.

In an alternate example, such as the example described above with reference to FIG. 8, upon determining that the payment data 708 matches, or otherwise corresponds to, at least a portion of the known payment data 710, the POS application 106 can send an activation notification 802 to the activation module 702. The activation notification 802 can provide a notification to the activation module 702 that the payment instrument 126 is activated. In some examples, responsive to receiving the activation notification 802, the activation module 702 can indicate such and can modify the default withdrawal channel associated with the stored balance 120. In at least one example, the activation module 702 can send a notification to the POS application 106 to notify the merchant 102 of this modification. Such a notification can be presented via the UI 706.

Block 912 illustrates modifying a default withdrawal channel associated with the stored balance. Responsive to activating the payment instrument 126, the activation module 702 can modify the default withdrawal channel associated with the stored balance 120. For example, in some instances, until a payment instrument is linked to a stored balance, scheduled deposits can be the default withdrawal channel. However, upon activation of a payment instrument, the activation module 702 can change the default withdrawal channel to the payment instrument, thereby allowing the stored balance 120 to increase. In such an example, the activation module 702 can send an indication to the merchant module 114 and/or the balance management module 118 to temporarily freeze or deactivate scheduled or instant deposits. Accordingly, funds from POS transactions can be stored in the stored balance 120 instead of being deposited into a linked bank account of the merchant 102 per a predetermined schedule (e.g., so the stored balance 120 has funds to be spent via use of the payment instrument 126). In at least one example, the activation module 702 can send a notification to the POS application 106 to notify the merchant 102 of this modification. Such a notification can be presented via the UI 706.

It should be understood that upon a cancellation or deactivation of the payment instrument 126, the activation module 702 can terminate the association between the stored balance 120 and the payment instrument 126 and the activation module 702 can modify the default withdrawal channel to scheduled deposits. Similarly, upon a temporary freeze of the payment instrument 126, the activation module 702 can update a merchant profile of the merchant 102 to indicate that the payment instrument 126 is temporarily frozen (e.g., unavailable) and can modify the default withdrawal channel to scheduled deposits. Further, the merchant 102 can toggle between default withdrawal channels at any time after activation.

In some examples, a merchant can deactivate, freeze, and/or cancel a payment instrument by an interaction as described above. That is, in at least one example, a merchant can interact with a UI to indicate a desire to deactivate, freeze, or cancel a payment instrument and can cause a dip, tap, or swipe between the payment instrument and the payment reader 704. In response, the activation module 702 can deactivate, freeze, or cancel the payment instrument, thereby "un-linking" the payment instrument from its associated stored balance.

Block 914 illustrates refraining from activating the payment instrument. If the payment data 708 and the known payment data 710 do not match or otherwise correspond, the activation module 702 or the POS application 106 can refrain from activating the payment instrument 126 and can present an indication via the UI 706 that the activation failed.

Figure 10:
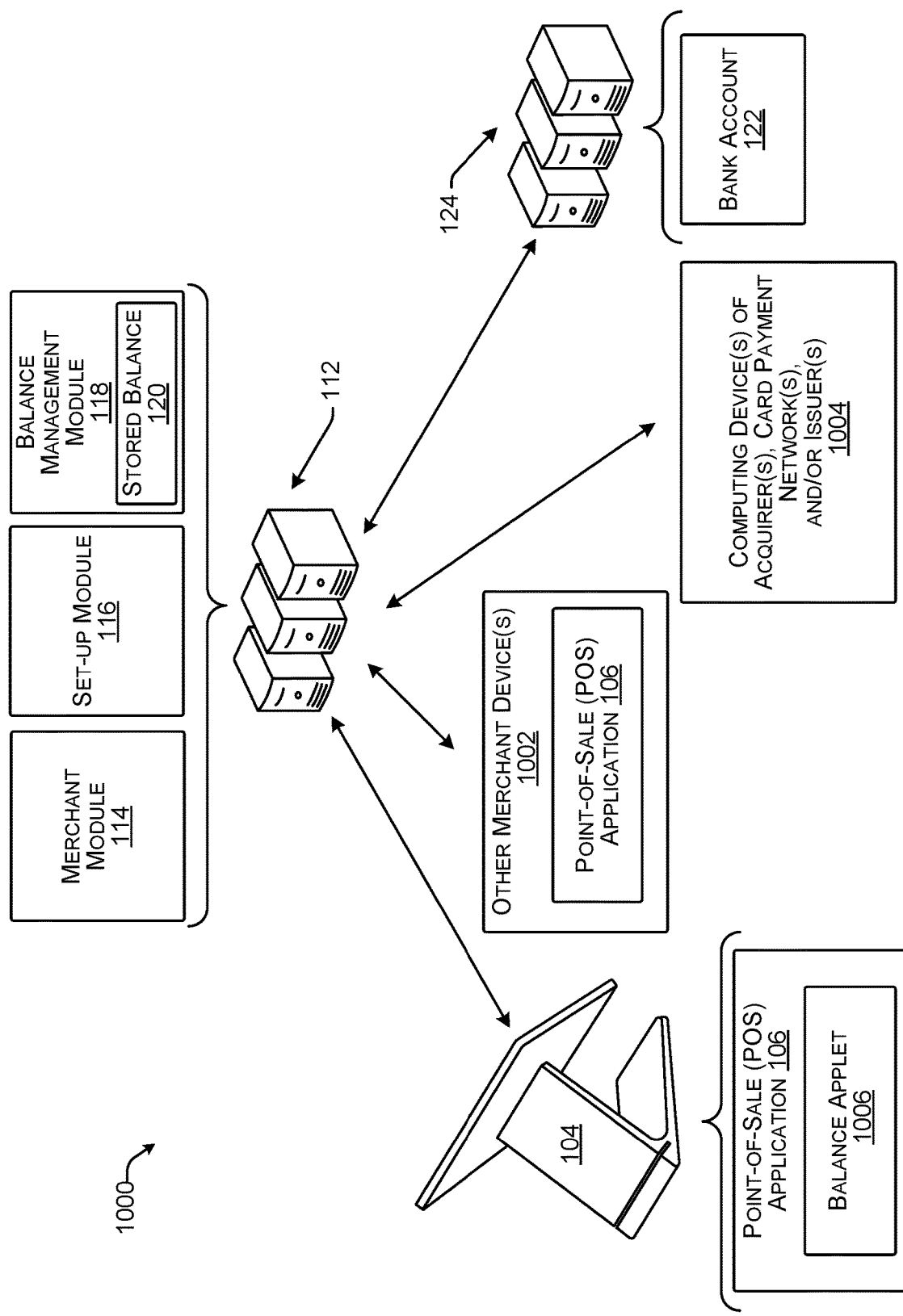
FIG. 10 illustrates an example environment for tracking the movement of funds in and out of a stored balance and enabling a merchant associated with the stored balance to manage their stored balance, as described herein.

FIG. 10 illustrates an example environment 1000 for tracking the movement of funds in and out of a stored balance and enabling a merchant associated with the stored balance to manage their stored balance. FIG. 10 depicts various components of FIG. 1. Additionally, FIG. 10 includes other merchant device(s) 1002 and computing device(s) of acquirer(s), card payment network(s), and/or issuer(s) 1004. As described above, the merchant 102 can use the payment instrument 126 (once activated) for making various purchases. In some examples, such purchases can be from another merchant that also subscribes to services of the payment processing service. That is, another merchant device 1002 can process a transaction between the other merchant and the merchant 102 via an instance of the POS application 106 on the other merchant device 1002. In other examples, the merchant 102 can use the payment instrument 126 (once activated) for making a purchase from a merchant that does not subscribe to services of the payment processing service.

In at least one example, payment instruments, such as the payment instrument 126, can be associated with one or more rewards or incentives to drive use by merchants. For instance, in an example, to encourage the merchant 102 to transact with other merchants that also subscribe to services of the payment processing service, the merchant 102 can receive a percentage of their transactions with other merchants that subscribe to services of the payment processing service back into their stored balance 120. That is, when the merchant 102 uses the payment instrument 126 to purchase an item from another merchant that subscribes to services of the payment processing service, the merchant module 114 can determine a predetermined amount (e.g., a percentage, fixed amount, etc.) of the cost of the item that is to be deposited into the stored balance 120. In such an example, the other merchant device(s) 1002 (e.g., the POS application 106) can send transaction data associated with the transaction between the merchant 102 and the other merchant to the merchant module 114. The merchant module 114 can determine that the payment data associated with the transaction is associated with the payment instrument 126, which is linked to the stored balance 120. The merchant module 114 can thus send an instruction to the balance management module 118 to credit the stored balance 120 by a predetermined amount of the purchase price, for example. As a result, the balance management module 118 can credit the stored balance 120 in the predetermined amount. In at least one example, the predetermined amount can correspond to an amount of a payment processing fee. In such an example, the other merchant can still pay a payment processing fee, but the payment processing service can transfer the amount of the fee (or a portion thereof) to the stored balance 120 (to reward the merchant 102 for shopping at another merchant that subscribes to the payment processing service).

Similarly, merchants can be rewarded or otherwise receive a discount for selling to, or otherwise transacting with, other merchants that subscribe to services of the payment processing service. For instance, in at least one example, when the merchant 102 uses the payment instrument 126 to purchase an item from another merchant that subscribes to services of the payment processing service, the merchant module 114 can waive the payment processing fee for the other merchant. In such an example, the other merchant device(s) 1002 (e.g., the POS application 106) can send transaction data associated with the transaction between the merchant 102 and the other merchant to the merchant module 114. The merchant module 114 can determine that the payment data associated with the transaction is associated with the payment instrument 126, which is linked to the stored balance 120. The merchant module 114 can thus send an instruction to the balance management module 118 to credit the stored balance of the other merchant by an amount of the purchase price without reducing the amount of the purchase price by the payment processing fee. As a result, the balance management module 118 can credit the stored balance of the other merchant in the amount of the purchase price (or an amount based on the purchase price).

The server(s) 112 can be configured to communicate with computing device(s) of acquirer(s), card payment network(s), and/or issuer(s) 1004 to conduct financial transactions electronically. For the sake of completeness, a buyer can use a payment instrument at a POS device of a seller. In some examples, the "buyer" can be a "merchant" as used herein. The computing device at the POS can send a fund transfer request for an amount of a transaction to a computing device of an acquiring bank ("acquirer"). In an example, an acquirer is a bank or financial institution that processes payments (e.g., credit or debit card payments) and can assume risk on behalf of sellers(s). An acquirer can be a registered member of a card association (e.g., Visa®, MasterCard®), and can be part of a card payment network. The acquirer (e.g., the associated computing device(s)) can send the fund transfer request to a computing device of a card payment network (e.g., Visa, MasterCard, Discover or American Express) to determine whether the transaction is authorized or deficient. In at least one example, the payment processing service can serve as an acquirer and connect directly with the card payment network.

The card payment network (e.g., the associated computing device(s)) can forward the fund transfer request to the computing device of an issuing bank (e.g., "issuer"). The issuer is a bank or financial institution that offers a financial account (e.g., credit or debit card account) to the customer. An issuer can issue payment cards to users and can pay acquirers for purchases made by cardholders to which the issuing bank has issued a payment card. The issuer (e.g., the associated computing device(s)) can make a determination as to whether the buyer has the capacity to absorb the relevant charge associated with the payment transaction. In at least one example, the payment processing service can serve as an issuer and/or can partner with an issuer. The transaction is either approved or rejected by the issuer and/or the card payment network (e.g., the associated computing device(s)), and a payment authorization message is communicated from the issuer to the POS device via a path opposite of that described above.

Environment 1000 also includes a balance applet 1006. After the payment instrument 126 is activated, the merchant 102 can use the payment instrument 126 for making purchases from other merchants (e.g., B2B, etc.). In at least one example, the payment processing service—via the balance management module 118—can track the movement of funds in and out of the stored balance 120 (e.g., via the payment instrument 126 or otherwise) and can enable the merchant 102 to manage their stored balance 120 via an applet, such as the balance applet 1006. In at least one example, the balance applet 1006 can be available via a web browser, or the like. In other examples, the balance applet 1006 can be available via an application, such as a mobile application or desktop application, which is provided by the payment processing service, or which can be an otherwise dedicated application. In at least one example, the balance applet 1006 can be available via the POS application 106 on the merchant device 104, as illustrated in FIG. 10.

In conventional technologies, merchants are required to access various reports to view recent deposits, various withdrawals, etc. Often, the time of day can impact which report a merchant needs to access to view such information. This can be confusing for merchants and causes a poor user experience. Further, multiple reports cause various inefficiencies. The balance applet 1006 can integrate multiple reports and functions into a single access point, thereby improving user interaction with the POS application 106 and/or merchant device 104. That is, the balance applet 1006 can offer a cohesive means of accessing various reports and functionalities. As non-limiting examples, the balance applet 1006 can enable the merchant 102 to check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Furthermore, the balance applet 1006 can enable merchants to visualize their cash flow to track their financial health, set aside money for upcoming obligations (e.g., savings), organize money around goals, etc.

In at least one example, the balance management module 118 can track the movement of funds in and out of the stored balance 120. The balance management module 118 can manage accounting of the stored balance 120. That is, the balance management module 118 can maintain a summary of all amounts debited or credited from the stored balance 120. In at least one example, the balance management module 118 can maintain the summary via a ledger, which can be a journal or other record-keeping mechanism that includes individual indications corresponding to each transaction. Each individual indication of a transaction in the ledger can be associated with transaction data and, in at least one example, the individual indications of the transactions can be arranged by date. In at least one example, an individual indication can be associated with an electronic record of the transaction (e.g., a receipt).

In at least one example, the balance management module 118 can credit the stored balance 120 based on funds received from POS transactions. For instance, the merchant module 114 can send an instruction to the balance management module 118 to add an amount to the stored balance 120. The amount can correspond to a cost of a transaction, or a portion thereof. In another example, the amount can correspond to costs of multiple transactions (or portions thereof). Additionally, the balance management module 118 can credit the stored balance 120 based on funds received from the linked bank account 122 of the merchant 102. That is, in some examples, the merchant 102 can request funds to be deposited into the stored balance 120 from its linked bank account 122.

Funds can be credited to the stored balance 120 via additional means that are within the scope of this disclosure. For instance, the balance management module 118 can credit the stored balance 120 based on a capital loan issued to the merchant 102. A capital loan is a loan, for instance from the payment processing service to a borrower, that is to be used for, in some instances, financing the borrower's short-term operational needs. For instance, a potential borrower that is a merchant can obtain a capital loan via a capital loan product in order to finance various operational costs (e.g., rent, payroll, inventory, etc.). In an example, the merchant 102 can obtain a capital loan from the payment processing service. In such an example, the balance management module 118 can credit the stored balance 120 in an amount of the capital loan. Furthermore, in some examples, the merchant 102 can receive a refund, the amount of which can be deposited into the stored balance 120 of the merchant 102. In such an example, the balance management module 118 can credit the stored balance 120 in an amount of the refund. Moreover, in at least one example, the merchant 102 can receive a reward, the amount of which can be deposited into the stored balance 120 of the merchant 102. In such an example, the balance management module 118 can credit the stored balance 120 in an amount of the reward.

In some examples, the merchant 102 can indicate that the merchant 102 desires to withhold at least some funds for another purpose, such as savings (e.g., for taxes, for a large purchase, for reserve funds, etc.). In such examples, the balance management module 118 can credit a portion of a POS transaction, for instance, to the stored balance 120, and can withhold a portion of the POS transaction from the stored balance 120. The portion of the POS transaction withheld from the stored balance 120 can be credited to a savings account linked to the stored balance 120, a sub-account within the stored balance 120, etc.

In at least one example, the balance management module 118 can debit the stored balance 120 based on scheduled deposits, instant deposits, and transactions using the payment instrument 126, as described above. In some examples, a scheduled deposit and/or an instant deposit can cause all of the funds in the stored balance 120 to be deposited into the linked bank account 122. In other examples, a portion of funds can remain in the stored balance 120 and a portion of funds can be deposited into the linked bank account 120. In any case, the balance management module 118 can debit the stored balance 120 in an amount corresponding to the amount of funds transferred to the linked bank account 122. The balance management module 118 can additionally or alternatively debit the stored balance 120 based on transactions between the merchant 102 and other merchants. That is, for a transaction completed using the payment instrument 126, the balance management module 118 can debit an amount of the transaction from the stored balance 120. In some examples, the merchant 102 can use the payment instrument 126 to withdraw cash from an ATM. In such examples, the balance management module 118 can debit an amount of the withdrawal from the stored balance 120.

In some examples, the merchant 120 can use the stored balance 120 for paying bills. In at least one example, the merchant 120 can set up an automatic bill pay using the stored balance 120. In other examples, the merchant 120 can use the stored balance 120 for one-time bill pay. In either case, the balance management module 118 can debit an amount of the bill(s) from the stored balance 120. Furthermore, the merchant 120 can use the stored balance 120 to repay a capital loan, as described above. In such an example, the balance management module 118 can debit the stored balance 120 in an amount equal to repayment of a capital loan.

Other debits are within the scope of this disclosure. For instance, in at least one example, the merchant 102 can make payroll payments via the stored balance 120. In such an example, the merchant 102 can request to transfer funds from the stored balance 120 to bank accounts of employees of the merchant 102. The balance management module 118 can debit an amount corresponding to a payroll payment from the stored balance 120. Similarly, the merchant 102 can order inventory via the payment processing service. In such examples, the payment processing service can facilitate a transfer of funds from the stored balance 120 of the merchant 102 to a stored balance of another merchant. The balance management module 118 can debit an amount corresponding to such a purchase from the stored balance 120.

Furthermore, the balance management module 118 can track fees (e.g., payment processing fees, capital loan repayment fees, interest, etc.) and debit such fees from the stored balance 120. Furthermore, in some examples, the merchant 102 can be penalized with a chargeback (e.g., a demand by a computing device(s) of acquirer(s), card payment network(s), and/or issuer(s) 1004 for the merchant 102 to make good on the loss on a fraudulent or disputed transaction), the amount of which can be withdrawn from the stored balance 120 of the merchant 102. In such an example, the balance management module 118 can debit the stored balance 120 in an amount of the chargeback.

In some examples, if the stored balance 120 is insufficient to cover a debit (e.g., a bill, payroll payment, chargeback, etc.), the balance management module 118 can send a request for funds from the linked bank account 122. If a bank account is not linked to the merchant profile of a merchant, the merchant can be required to provide bank account data for linking a bank account to the merchant profile. In other examples, the payment processing service can send an offer for a capital loan to cover the deficiency. Additionally or alternatively, the payment processing service can float the deficiency and collect the deficiency from POS transaction funds received in the future.

Furthermore, in at least one example, the balance management module 118 can analyze the individual transactions to determine whether such transactions are business transactions or personal transactions (e.g., classify the transactions). In such an example, the balance management module 118 can utilize a machine-trained model to output an indication of whether an individual transaction is a business transaction or a personal transaction. The balance management module 118 can add an indicator of such to the indication of the transaction in the ledger. As described below, the merchant 102 can interact with a UI to modify the classification.

In at least one example, the machine-trained model can be trained via a machine learning mechanism. In such an example, the model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model can be trained on training data associated with a plurality of merchants. The training data can include a plurality of transactions and associated transaction data, and merchant data associated with merchants participating in the plurality of transactions. As a result, the machine-trained model can output a prediction that a particular transaction is associated with a business transaction of the merchant or a personal transaction. As a non-limiting example, the machine-trained model can classify a purchase of shampoo as a business transaction for a merchant that provides salon services but can classify a purchase of shampoo as a personal transaction for a merchant that provides restaurant services.

The balance applet 1006 can enable the merchant 102 to access and view a UI representative of the ledger (or a portion thereof) corresponding to its stored balance 120. In at least one example, the balance applet 1006 can present a UI that presents the current value of the stored balance 120 and includes indications of credits, debits, etc. In some examples, a portion of the ledger representing the most recent transactions can be presented, while the entire ledger can be accessible via an interaction with the UI. In at least one example, the credits, debits, etc. can be itemized. In other examples, the credits, debits, etc. can be aggregated, for instance by date, creditor/debtor, type of credit/debit, etc. In some examples, the UI can indicate an estimated date of an expected credit or debit, if applicable.

The balance applet 1006 can also enable the merchant 102 to manage its stored balance 120. That is, the UI can enable the merchant 102 to schedule (or modify an existing schedule for) a scheduled deposit, request an instant deposit, order a payment instrument, etc. In at least one example, the balance applet 1006 can enable the merchant 102 to check the status of an ordered payment instrument, cancel and/or deactivate a payment instrument (e.g., if the payment instrument 126 is lost or stolen), reorder a new payment instrument, temporarily freeze a payment instrument, etc. Furthermore, the balance applet 1006 can enable the merchant 102 to access their pending deposit balance, deposit reports, deposit schedules, spend reports, linked accounts and/or payment instruments, etc. In some examples, the balance applet 1006 can enable the merchant 102 to access sales reports. The balance applet 1006 can additionally enable the merchant 102 to change their deposit speeds, update their close of day, link new bank accounts, modify default withdrawal channels (e.g., from scheduled deposit to maintaining funds in the stored balance 120, from maintaining funds in the stored balance 120 to scheduled deposits, etc.), etc. Further, in some examples, the balance applet 1006 can surface information about unusual activity, suspicious activity, etc.

In at least one example, the merchant 102 can access the balance applet 1006 by causing the payment instrument 126 to interact (e.g., via a swipe, dip, or tap) with a payment reader (e.g., the payment reader 704). For example, the merchant 102 can swipe the payment instrument 126 via the payment reader 704. The payment reader 704 can read the payment data off the payment instrument 126 and transmit the payment data to the POS application 106. The POS application 106 can determine that the payment data corresponds to the payment instrument 126 and can open the balance applet 1006. That is, responsive to receiving the payment data associated with the payment instrument 126, the POS application 106 can cause the UI of the balance applet 1006 to be presented via the merchant device 104. In at least one example, the payment data can be received at a time independent of a transaction. That is, in such an example, the POS application 106 can receive the payment data at a time independent of a transaction and determine that the payment data corresponds to the payment instrument 126. Responsive to the payment data being received at a time separate from a transaction, the POS application 106 can open the balance applet 1006.

In at least one example, access to the balance applet 1006 can be limited by one or more permissions. For instance, the balance applet 1006 can be accessible to an owner and/or administrator of the merchant 102, but not to an employee of the merchant 102. Or, individual functions of the balance applet 1006 can be accessible to an employee and other individual functions can be limited. In at least one example, an employee of the merchant 102 can attempt to access the balance applet 1006. The employee can be logged into the POS application 106 via a unique identifier. The POS application 106 can compare the unique identifier to one or more unique identifiers that have permission to access the balance applet 1006 and, if the unique identifier is not one of the one or more unique identifiers, the POS application 106 can deny the employee access to the balance applet 1006. In another example, some aspects of the balance applet 1006 can be available to the employee but other aspects may not. In yet another example, upon receiving a request to access the balance applet 1006, the POS application 106 can request a permission code to be entered. If the permission code is provided, the POS application 106 can enable access to the balance applet 1006. If the permission code is not provided, the POS application 106 can deny access to the balance applet 1006. In another example, some aspects of the balance applet 1006 can be available but other aspects may not. That is, failure to provide the correct permission code can cause at least some functionality of the balance applet 1006 to be inaccessible.

Figure 11:
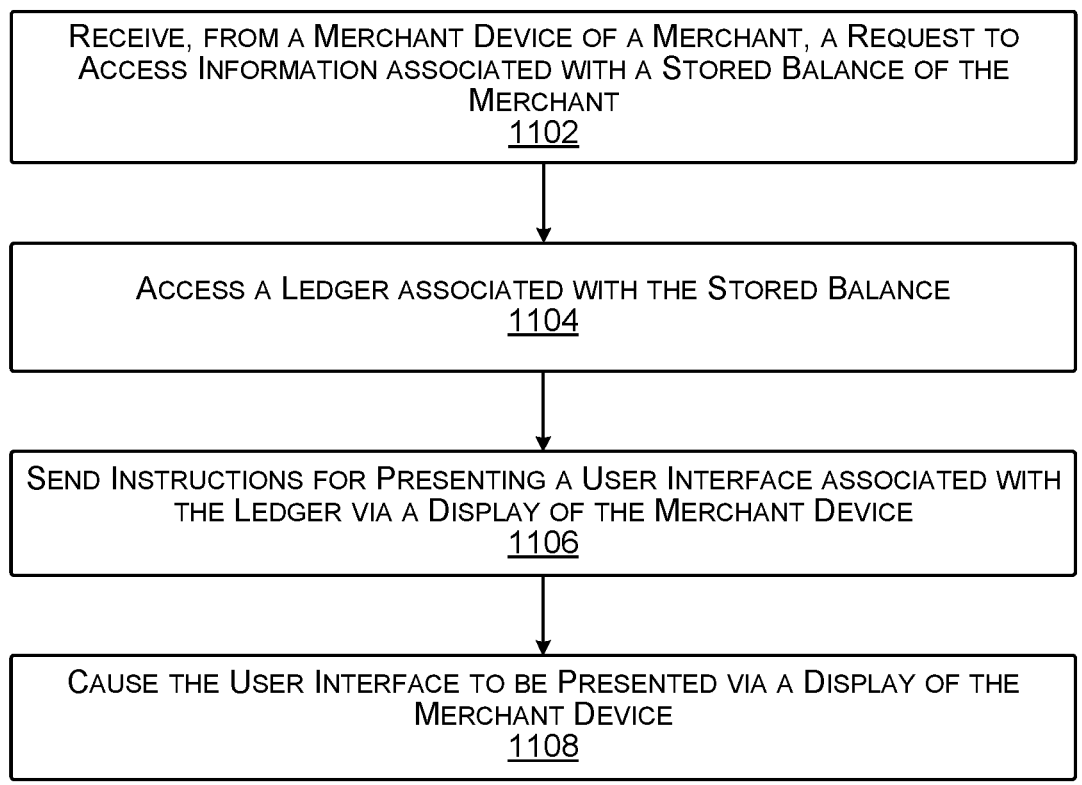
FIG. 11 illustrates an example process for presenting a UI representative of the ledger (or a portion thereof) corresponding to its stored balance, as described herein.

FIG. 11 illustrates an example process 1100 for presenting a UI representative of the ledger (or a portion thereof) corresponding to its stored balance.

Block 1102 illustrates receiving, from a merchant device of a merchant, a request to access information associated with a stored balance of the merchant. In at least one example, the merchant 102 can interact with a UI presented in association with the POS application 106 to request access to their stored balance 120. In at least one example, responsive to receiving such a request, the POS application 106 can open the balance applet 1006.

Block 1104 illustrates accessing a ledger associated with the stored balance. In at least one example, the balance applet 1006 can send a request to access the ledger associated with the stored balance 120. The balance management module 118 can receive the request and can access the ledger.

Block 1106 illustrates sending instructions for presenting a user interface associated with the ledger via a display of the merchant device. The balance management module 118 can generate and send instructions to the balance applet 1006 to enable the balance applet 1006 to present a graphical representation of the ledger, or a portion thereof.

Block 1108 illustrates causing the user interface to be presented via a display of the merchant device. As described above, the balance applet 1006 can present a UI that presents the current value of the stored balance 120 (e.g., 1202) and includes indications 1204 of credits, debits, etc. In some examples, a portion of the ledger representing the most recent transactions can be presented, while the entire ledger can be accessible via an interaction with the UI. In at least one example, the credits, debits, etc. can be itemized. In other examples, the credits, debits, etc. can be aggregated, for instance by date, creditor/debtor, type of credit/debit, etc. In some examples, the UI can indicate an estimated date of an expected credit or debit, if applicable.

Figure 12:
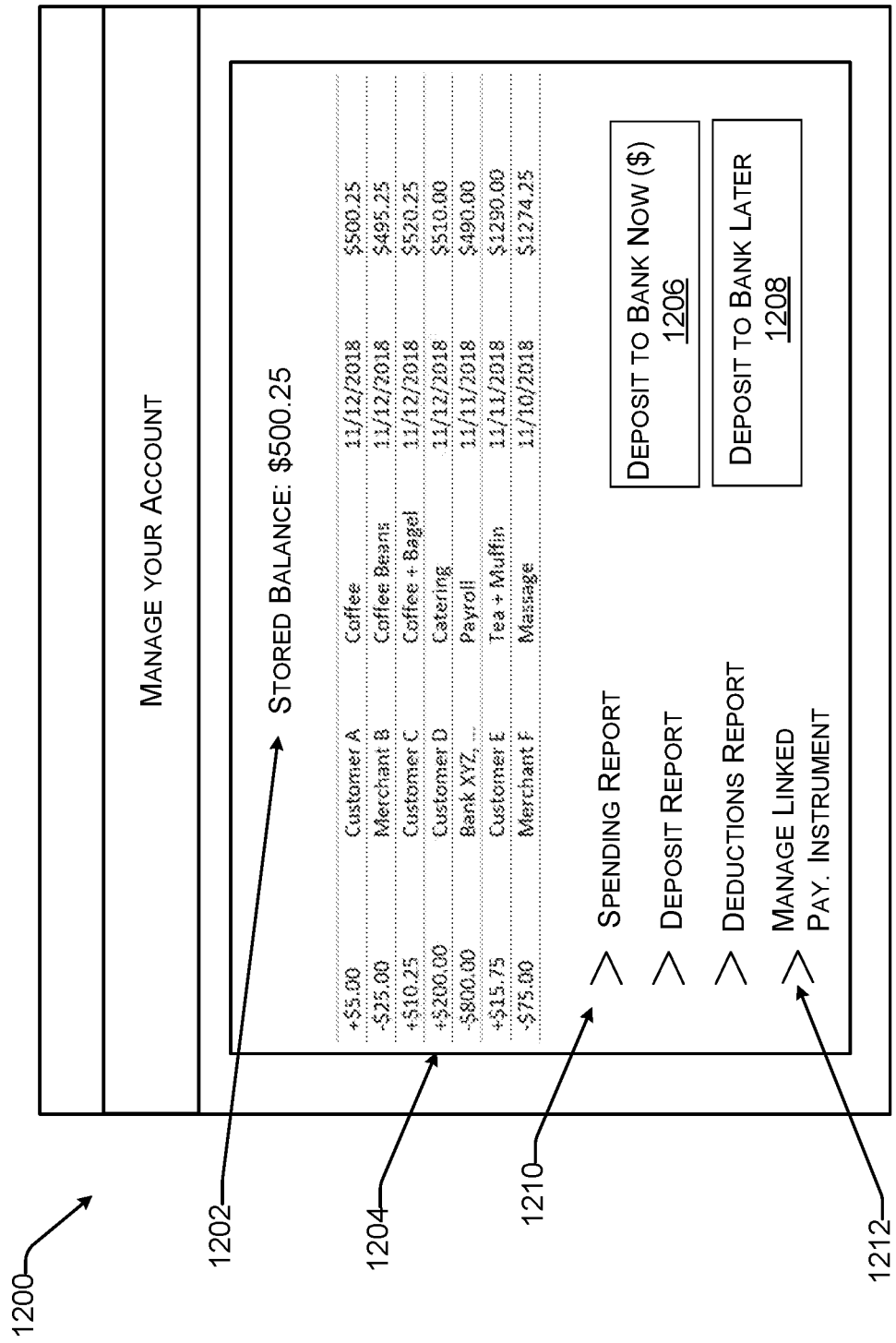
FIG. 12 illustrates an example UI for presenting at least a portion of a ledger of a stored balance of a merchant, as described herein.

FIG. 12 illustrates an example UI 1200 for presenting at least a portion of a ledger of a stored balance of a merchant.

As described above, the balance applet 1006 can enable the merchant 102 to access and view a UI representative of the ledger (or a portion thereof) corresponding to its stored balance 120. In at least one example, the balance applet 1006 can present a UI that presents the current value of the stored balance 120 (e.g., 1202) and includes indications 1204 of credits, debits, etc. In some examples, a portion of the ledger representing the most recent transactions can be presented, while the entire ledger can be accessible via an interaction with the UI. In at least one example, the credits, debits, etc. (e.g., 1204) can be itemized. In other examples, the credits, debits, etc. can be aggregated, for instance by date, creditor/debtor, type of credit/debit, etc. In some examples, the UI can indicate an estimated date of an expected credit or debit, if applicable.

The balance applet 1006 can also enable the merchant 102 to manage its stored balance 120. That is, the UI can enable the merchant 102 to schedule (or modify an existing schedule for) a scheduled deposit, request an instant deposit, order a payment instrument, etc. As an example, UI 1200 includes a selectable control 1206 that enables the merchant 102 to transfer at least a portion of the funds in the stored balance 120 to their bank account 122 "now" (e.g., via an instant deposit). As another example, UI 1200 includes a selectable control 1208 that enables the merchant 102 to transfer at least a portion of the funds in the stored balance 120 to their bank account 122 "later" (e.g., via a scheduled deposit).

Furthermore, the balance applet 1006 can enable the merchant 102 to access their pending deposit balance, deposit reports, deposit schedules, spend reports, linked accounts and/or payment instruments, etc. In at least one example, the UI 1200 can include selectable controls 1210, that when selected, cause corresponding reports to be presented to the merchant 102. In some examples, such reports can open in the same UI 1200. In other examples, such reports can open in a new window, which may or may not overlay the UI 1200.

In at least one example, the balance applet 1006 can enable the merchant 102 to manage their linked payment instrument, for instance by enabling the merchant 102 to check the status of an order payment instrument, cancel and/or deactivate a payment instrument (e.g., if the payment instrument 126 is lost or stolen), reorder anew payment instrument, temporarily freeze a payment instrument, etc., such as via interaction with a selectable control 1212 that causes one or more payment instrument management UIs to be presented. In some examples, such UI(s) can open in the same UI 1200. In other examples, such UI(s) can open in a new window, which may or may not overlay the UI 1200.

UI 1200 is but one example of a UI that can present at least a portion of the ledger associated with the stored balance 120 and other functionalities availed via the balance applet 1006 and other configurations and designs are capable of presenting the same information and/or enabling access to the same functionalities.

Figure 13:
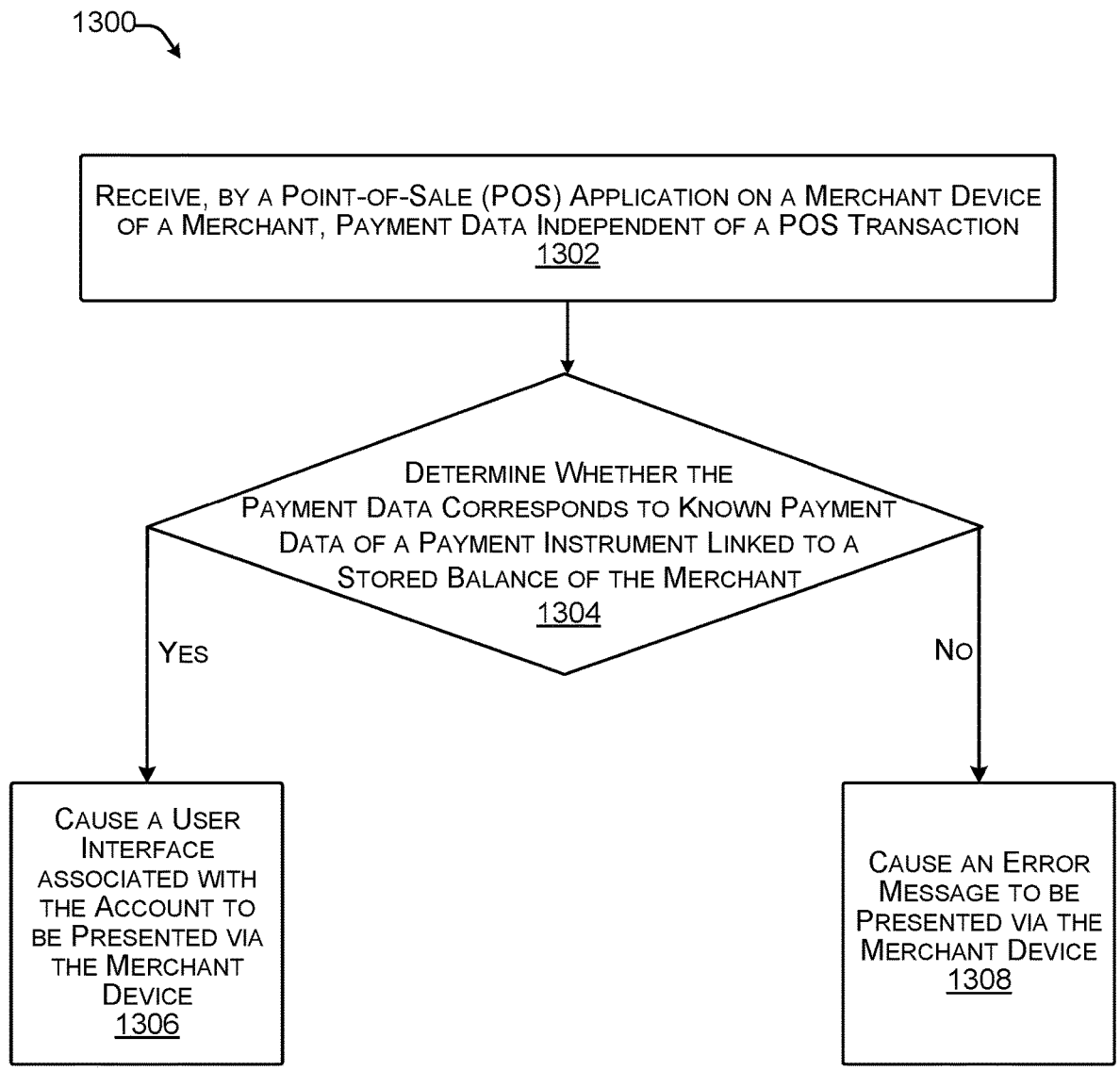
FIG. 13 illustrates an example process for opening a balance applet responsive to an interaction between a payment instrument and a payment reader, as described herein.

As described above, in at least one example, the merchant 102 can access the balance applet 1006 by causing the payment instrument 126 to interact (e.g., via a swipe, dip, or tap) with a payment reader (e.g., the payment reader 704). FIG. 13 illustrates an example process 1300 for opening a balance applet responsive to an interaction between a payment instrument interacting with a payment reader.

Block 1302 illustrates receiving, via a POS application on a merchant device of a merchant, payment data independent of a POS transaction. In at least one example, the merchant 102 can cause an interaction (e.g., a dip, a tap, or a swipe) between the payment instrument 126 and the payment reader 704. The payment reader 704 can read the payment data off the payment instrument 126 and can transmit the payment data to the POS application 106. The POS application 106 can receive the payment data. The POS application 106, as described above, can be used for processing transactions at the POS. Accordingly, the POS application 106 can know whether the payment data is received in association with a POS transaction. In at least one example, when the merchant 102 desires to access the balance applet 1006, the payment data can be received independent of a POS transaction.

Block 1304 illustrates determining whether the payment data corresponds to known payment data of a payment instrument linked to a stored balance of a merchant. In at least one example, the POS application 106 can determine whether the payment data corresponds to known payment data associated with a payment instrument. In some examples, the POS application 106 can store the known payment data of the payment instrument 126 such that the POS application 106 can determine that the payment data corresponds to the known payment data. Responsive to receiving the payment data associated with the payment instrument 126, the POS application 106 can cause the UI of the balance applet 1006 to be presented via the merchant device 104, as illustrated in block 1306. If the payment data does not correspond to the known payment data, the POS application 106 can cause an error message to be presented via the merchant device 104.

As described above, the balance management module 118 can analyze the individual transactions to determine whether such transactions are business transactions or personal transactions (e.g., classify the transactions). The balance management module 118 can add an indicator of such to the indication of the transaction in the ledger, which can be surfaced via the UI presented via the balance applet 1006.

Figure 14:
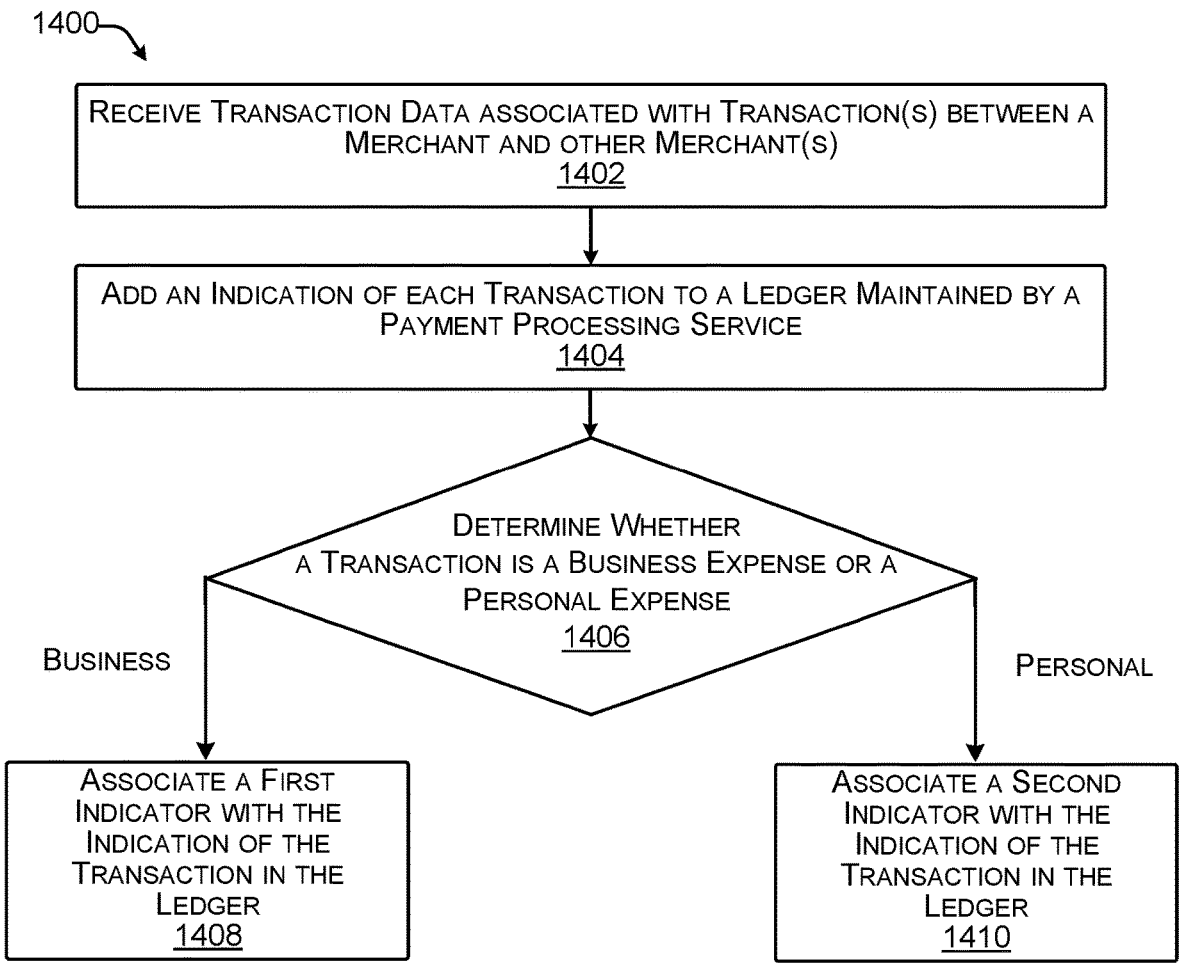
FIG. 14 illustrates an example process for classifying transactions, as described herein.

FIG. 14 illustrates an example process 1400 for classifying transactions.

Block 1402 illustrates receiving transaction data associated with transaction(s) between a merchant and other merchants. In at least one example, the balance management module 118 can receive transaction data. In some examples, the transaction data can be received from the merchant module 114, for instance when the other merchants subscribe to services of the payment processing service. In other examples, the transaction data can be received from computing device(s) of acquirer(s), card payment network(s), and/or issuer(s) 1004. The transaction data can include payment data, user authentication data, purchase amount information, point-of-purchase information (e.g., item(s) purchased, date of purchase, time of purchase, etc.), etc.

Block 1404 illustrates adding an indication of each transaction to a ledger maintained by a payment processing service. As described above, the balance management module 118 can manage accounting of the stored balance 120. That is, the balance management module 118 can maintain a summary of all amounts debited or credited from the stored balance 120. In at least one example, the balance management module 118 can maintain the summary via a ledger, which can be a journal or other record-keeping mechanism that includes individual indications corresponding to each transaction. Each individual indication of a transaction in the ledger can be associated with transaction data and, in at least one example, the individual indications of the transactions can be arranged by date.

Block 1406 illustrates determining whether a transaction is a business expense or a personal expense. As described above, in at least one example, the balance management module 118 can analyze the individual transactions to determine whether such transactions are business transactions or personal transactions (e.g., classify the transactions). In such an example, the balance management module 118 can utilize a machine-trained model to output an indication of whether an individual transaction is a business transaction or a personal transaction. The balance management module 118 can add an indicator of such to the indication of the transaction in the ledger. For instance, responsive to determining that the transaction is associated with a business expense, the balance management module 118 can associate a first indication with the indication of the transaction in the ledger, as illustrated in block 1408. And, responsive to determining that the transaction is associated with a personal expense, the balance management module 118 can associate a second indicator with the indication of the transaction in the ledger, as illustrated in block 1410. The first indicator and the second indicator can enable the merchant 102 to visually distinguish between business transactions and personal transactions. As described below, the merchant 102 can interact with a UI to modify the classification.

Figure 15:
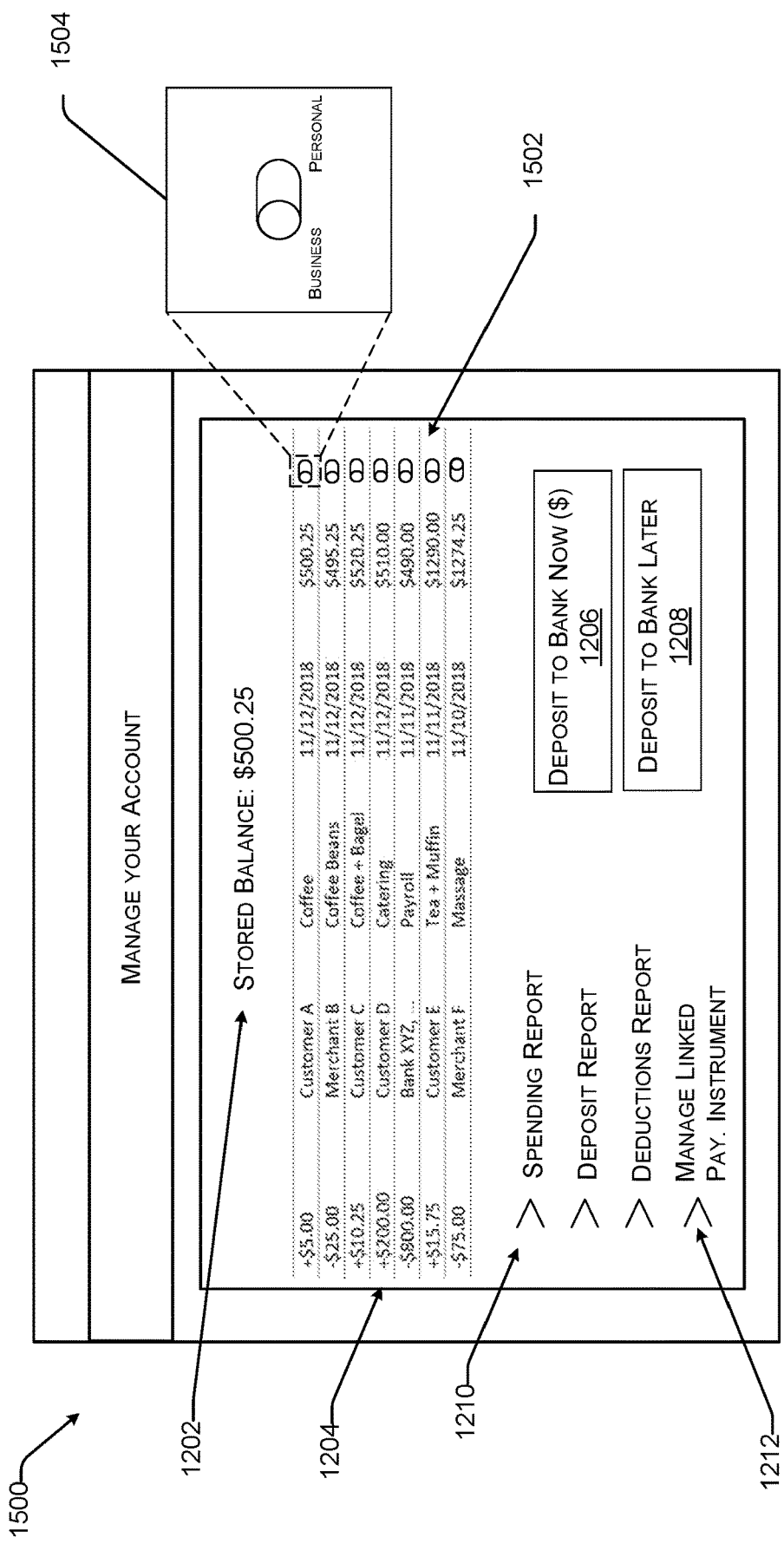
FIG. 15 is an example UI for presenting at least a portion of a ledger of a stored balance of a merchant, wherein individual transactions are associated with an indicator as to whether the transaction is a business expense or a personal expense, as described herein.

FIG. 15 is an example UI 1500 for presenting at least a portion of a ledger of a stored balance of a merchant, wherein individual transactions are associated with an indicator as to whether the transaction is a business expense or a personal expense. As described above, the balance applet 1006 can enable the merchant 102 to access and view a UI representative of the ledger (or a portion thereof) corresponding to its stored balance 120. Details associated with such a UI are described above with reference to FIG. 12.

In at least one example, as described above with reference to FIG. 14, the balance management module 118 can classify transactions (e.g., as business or personal expenses) and can add indicators to corresponding indications in the ledger. FIG. 15 illustrates graphical representations 1502 of such indicators. The graphical representations 1502 are provided for illustrative purposes and any design or configuration can be used to denote that a transaction is a business expense or a personal expense. In at least one example, the merchant 102 can interact with the UI 1500 to classify or modify the classification of a transaction. For instance, one of the indicators 1504 is enlarged so that details can be observed. As illustrated, the indicator 1504 is a toggle, which allows the merchant 102 to indicate whether the corresponding transaction is a business expense or a personal expense. In at least one example, the UI can present the indicators 1502 based on classifications by the balance management module 118 or previous classifications (or corrections) by the merchant 102.

UI 1500 is but one example of a UI that can present at least a portion of the ledger associated with the stored balance 120 and other functionalities availed via the balance applet 1006 and other configurations and designs are capable of presenting the same information and/or enabling access to the same functionalities.

Figure 16:
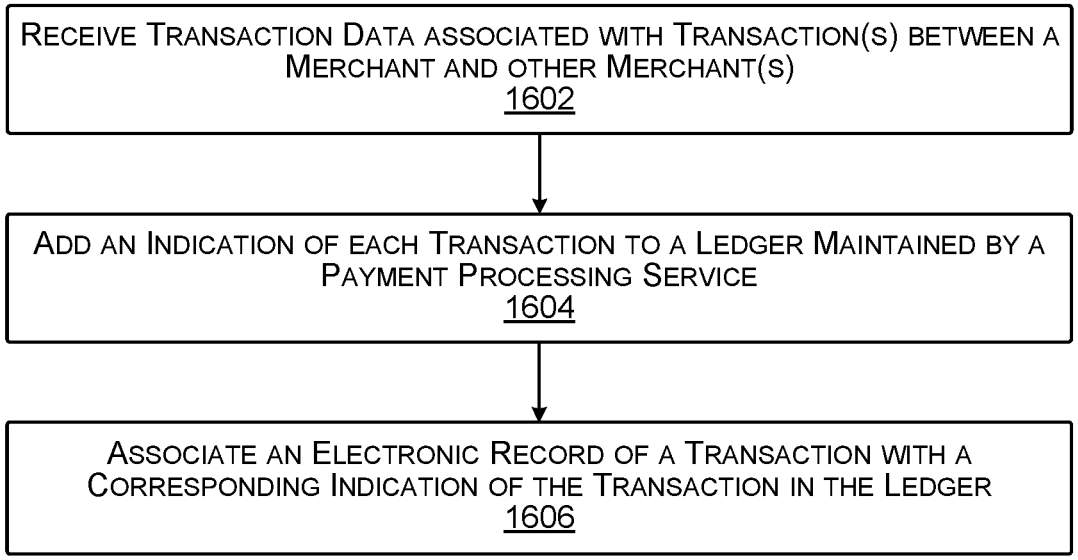
FIG. 16 illustrates an example process for associating electronic records with indications of transactions in a ledger, as described herein.

FIG. 16 illustrates an example process 1600 for associating electronic records with indications of transactions in a ledger.

Block 1602 illustrates receiving transaction data associated with transaction(s) between a merchant and other merchants. In at least one example, the balance management module 118 can receive transaction data. In some examples, the transaction data can be received from the merchant module 114, for instance when the other merchants subscribe to services of the payment processing service. In other examples, the transaction data can be received from computing device(s) of acquirer(s), card payment network(s), and/or issuer(s) 1004. The transaction data can include payment data, user authentication data, purchase amount information, point-of-purchase information (e.g., item(s) purchased, date of purchase, time of purchase, etc.), etc.

Block 1604 illustrates adding an indication of each transaction to a ledger maintained by a payment processing service. As described above, the balance management module 118 can manage accounting of the stored balance 120. That is, the balance management module 118 can maintain a summary of all amounts debited or credited from the stored balance 120. In at least one example, the balance management module 118 can maintain the summary via a ledger, which can be a journal or other record-keeping mechanism that includes individual indications corresponding to each transaction. Each individual indication of a transaction in the ledger can be associated with transaction data and, in at least one example, the individual indications of the transactions can be arranged by date.

Block 1606 illustrates associating an electronic record of a transaction with a corresponding indication of the transaction in the ledger. In at least one example, an individual indication can be associated with an electronic record of the transaction (e.g., a receipt). That is, in some examples, the transaction data can include an electronic record of the transaction. The balance management module 118 can associate the electronic record with the indication of the transaction. In at least one example, the electronic record can be presented to the merchant 102, responsive to the merchant 102 interacting with a UI presenting at least a portion of the ledger.

Figure 17:
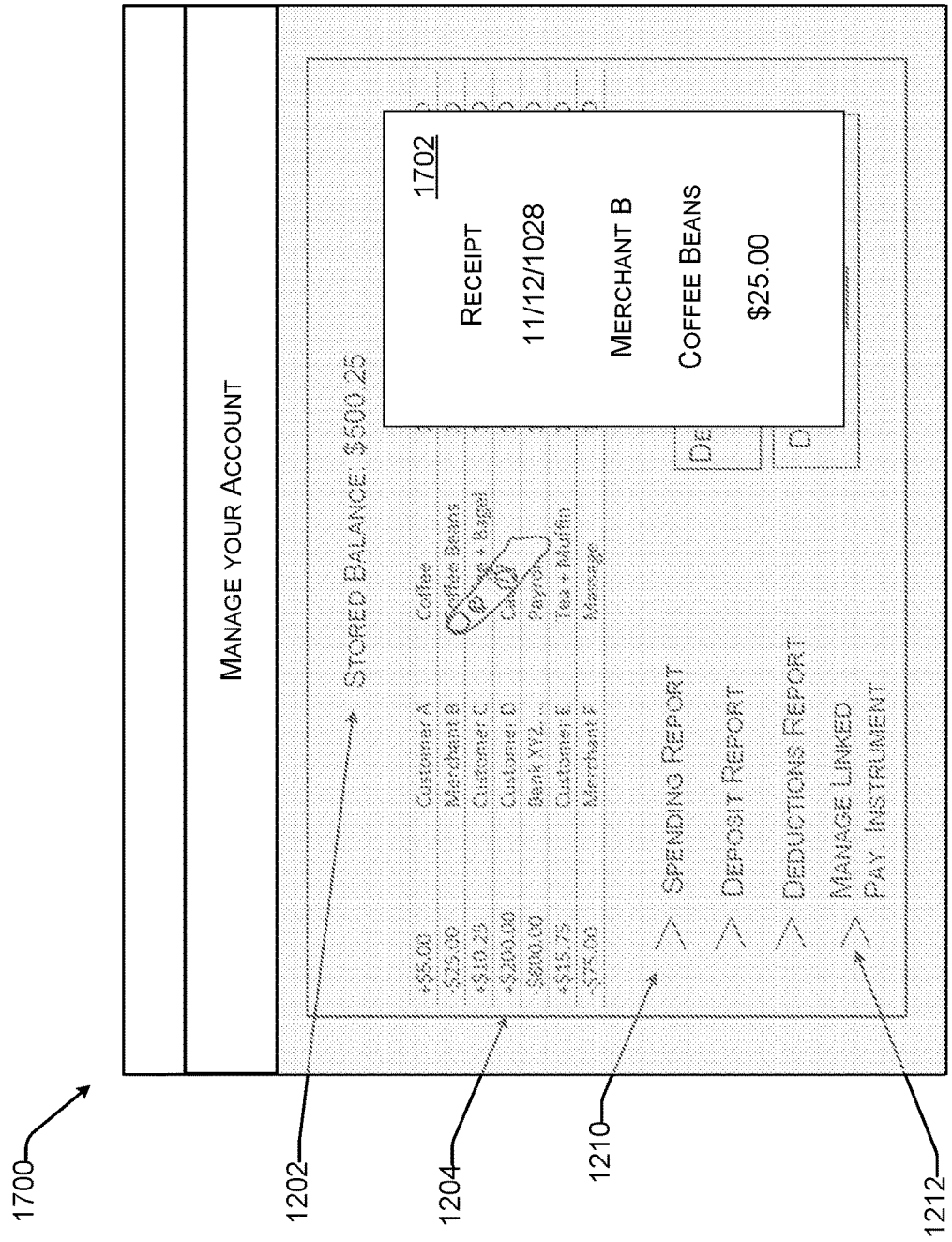
FIG. 17 is an example UI for presenting at least a portion of a ledger of a stored balance of a merchant, wherein individual transactions are associated with electronic records of the individual transactions, as described herein.

FIG. 17 is an example UI 1700 for presenting at least a portion of a ledger of a stored balance of a merchant, wherein individual transactions are associated with electronic records of the individual transactions. As described above, the balance applet 1006 can enable the merchant 102 to access and view a UI representative of the ledger (or a portion thereof) corresponding to its stored balance 120. Details associated with such a UI are described above with reference to FIG. 12.

In at least one example, individual indications of transactions in the ledger can be associated with selectable controls that enable the merchant 102 to view corresponding electronic records. For instance, when the merchant 102 actuates a selectable control corresponding to a transaction, the balance applet 1006 can cause an electronic record 1702 corresponding to that transaction to be presented via the UI 1700. In some examples, the electronic record 1702 can be presented as an overlay, as illustrated in FIG. 17. However, in other examples, the electronic record 1702 can be presented within the UI or via another UI.

UI 1700 is but one example of a UI that can present at least a portion of the ledger associated with the stored balance 120 and other functionalities availed via the balance applet 1006 and other configurations and designs are capable of presenting the same information and/or enabling access to the same functionalities.

Figure 18:
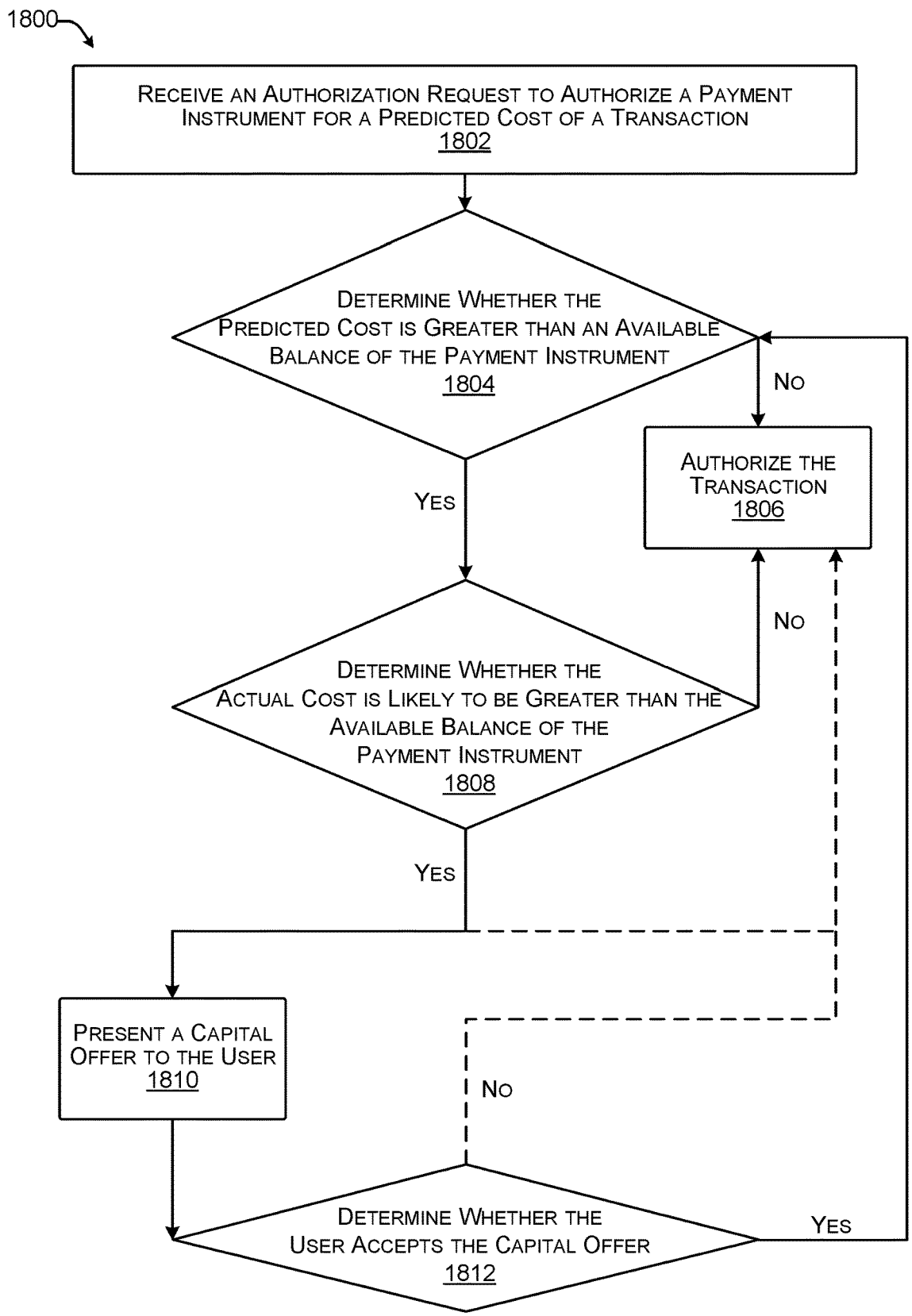
FIG. 18 illustrates an example process for intelligently managing authorization requests, as described herein.

FIG. 18 illustrates an example process 1800 for intelligently managing authorization requests. As described above, in an example, when a payment processing service controls a payment instrument, such as they payment instrument 126 that is linked to the stored balance 120, and receives an authorization request in association with a transaction, instead of automatically declining (if account balance is below the amount of the authorization request), the payment processing service can approve the authorization request (and thus, temporarily cover the cost of the transaction) if the payment processing service believes that the ultimately charged amount will be less than or equal to the account balance.

Conventional techniques immediately decline a transaction if the available balance of a payment instrument is insufficient to satisfy a predicted cost of a transaction, or permit the transaction, but penalize the buyer with an overdraft charge. Techniques described herein reduce the number of declines experienced by payment instrument users, thereby improving user experience and decreasing frustration caused by conventional authorization request management. Furthermore, the unconventional techniques described herein are directed to decongesting networks associated with payment processing and increasing bandwidth within the payment processing network.

Block 1802 illustrates receiving an authorization request to authorize a payment for a predicted cost of a transaction. In at least one example, a buyer can use a payment instrument to pay for a transaction with a seller. For instance, the merchant 102 (e.g., the buyer) can use the payment instrument 126 linked to their stored balance 120 to pay for a transaction with another merchant (e.g., the seller). In at least one example, a POS device can send payment data to a computing device of an acquirer. In some examples, the actual cost of the transaction may not be known and thus the POS device (or application running thereon) can predict a cost of the transaction (e.g., "predicted cost"). A computing device of the acquirer can send a request for a transfer of funds to a computing device of a card payment network. The computing device of the card payment network can forward the request to a computing device of an issuer of the payment instrument. In some examples, the payment processing service can be the acquirer, card payment network, and/or the issuer (or a partner of the issuer).

Block 1804 illustrates determining whether the predicted cost is greater than an available balance of the payment instrument. In at least one example, the merchant module 114 can determine an available balance associated with the payment instrument. In some examples, the available balance can correspond to a stored balance (e.g., the stored balance 120) that is linked to the payment instrument (e.g., the payment instrument 126) and managed via a ledger associated with the payment processing service. In other examples, the available balance can be associated with a gift card balance, credit card limit, etc. In at least one example, the merchant module 114 can communicate with the computing device(s) of acquirer(s), card payment network(s), and/or issuer(s) 1004 and/or access the stored balance 120 (if applicable) to ascertain the available balance of the payment instrument. The merchant module 114 can compare the predicted cost of the transaction to the available balance of the payment instrument. If the predicted cost of the transaction is less than or equal to the available balance, the merchant module 114 can approve the transaction, as illustrated in block 1806. If the predicted cost of the transaction is greater than the available balance, the merchant module 114 can determine whether the actual cost of the transaction is likely to be greater than the available balance of the payment instrument.

Block 1808 illustrates determining whether the actual cost is likely to be greater than the available balance of the payment instrument. In at least one example, the merchant module 114 can utilize a machine-trained model to predict the actual cost of the transaction. In at least one example, the machine-trained model can be trained via a machine learning mechanism. In such an example, the model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model can be trained on training data associated with a plurality of merchants and POS transactions. The training data can include a plurality of POS transactions and associated transaction data, which can be itemized. As a result, the machine-trained model can output a prediction of an actual cost of an item and/or item(s) in a transaction.

In at least one example, the machine-trained model can output a prediction of an actual cost of an item and/or item(s) based on transaction data associated with other merchants that are similar to a seller in a transaction. For instance, the machine-trained model can output a prediction based on item prices offered for sale by other merchants in a same MCC, a same geolocation, a same price-point, etc. as the seller in the transaction. In an additional or alternative example, the machine-trained model can output a prediction of an actual cost of an item and/or item(s) based on transaction data associated with transactions that are similar to the transaction. For instance, the machine-trained model can output a prediction based on item prices of items in transactions with one or more of the same parties (e.g., buyer and/or seller), transactions in a same geolocation, transactions at a same time, etc.

Based at least in part on determining that the actual cost is not likely to be greater than the available balance of the payment instrument, the merchant module 114 can authorize the transaction, as illustrated in block 1806. However, based at least in part on determining that the actual cost is likely to be greater than the available balance of the payment instrument, the merchant module 114 can, in one example, present a capital offer to the buyer, as illustrated in block 1810. In another example, the merchant module 114 can deny the transaction (which is not shown) or, the merchant module 114 can authorize the transaction, as illustrated in block 1806, and can collect a difference between the actual cost of the transaction and the available balance via funds received by the buyer from future POS transactions (e.g., when using the payment processing service for processing POS transactions). In such an example, the payment processing service can float the difference between the actual cost of the transaction and the available balance (thereby not declining the transaction) and can recover the difference via withholding funds from future POS transactions processed by the merchant module 114. In such an example, the transaction is not treated as an overdraft, and the buyer can proceed with the transaction.

Block 1810 illustrates presenting a capital offer to the buyer. As described above, a capital loan is a loan, for instance from the payment processing service to a borrower, that is to be used for, in some instances, financing the borrower's short-term operational needs. For instance, a potential borrower that is a merchant can obtain a capital loan via a capital loan product in order to finance a difference between the available balance of the payment instrument and the actual cost of the transaction. In at least one example, the merchant module 114 can determine a difference between the available balance of the payment instrument and the actual cost of the transaction (as predicted per block 1808 above). The merchant module 114 can leverage one or more risk analyses to determine whether the buyer qualifies for a capital loan and an amount of a capital loan for which they are qualified. If the buyer qualifies for a capital loan, the merchant module 114 can send a capital loan offer to the buyer (e.g., via a computing device associated with the buyer) in an amount at least equal to the difference between the available balance of the payment instrument and the actual cost of the transaction.

Block 1812 illustrates determining whether the buyer accepts the capital offer. Based at least in part on the buyer accepting the capital offer, the merchant module 114 can authorize the transaction, as illustrated in block 1806. In some examples, if the payment instrument is associated with a stored balance maintained by the payment processing service, the balance management module 118 can add the amount of the capital loan to the stored balance (e.g., as a credit).

In at least one example, the buyer may not accept the capital offer. In such an example, the merchant module 114 can deny the transaction (which is not shown) or, the merchant module 114 can authorize the transaction, as illustrated in block 1806, and can collect a difference between the actual cost of the transaction and the available balance via funds received by the buyer from future POS transactions. In such an example, the payment processing service can float the difference between the actual cost of the transaction and the available balance (thereby not declining the transaction) and can recover the difference via withholding funds from future POS transactions processed by the merchant module 114. In such an example, the transaction is not treated as an overdraft, and the buyer can proceed with the transaction.

While FIG. 18 makes reference to using the payment instrument 126, which is linked to the stored balance 120, payment transactions using any payment instrument can be handled in a same or similar way.

Figure 19:
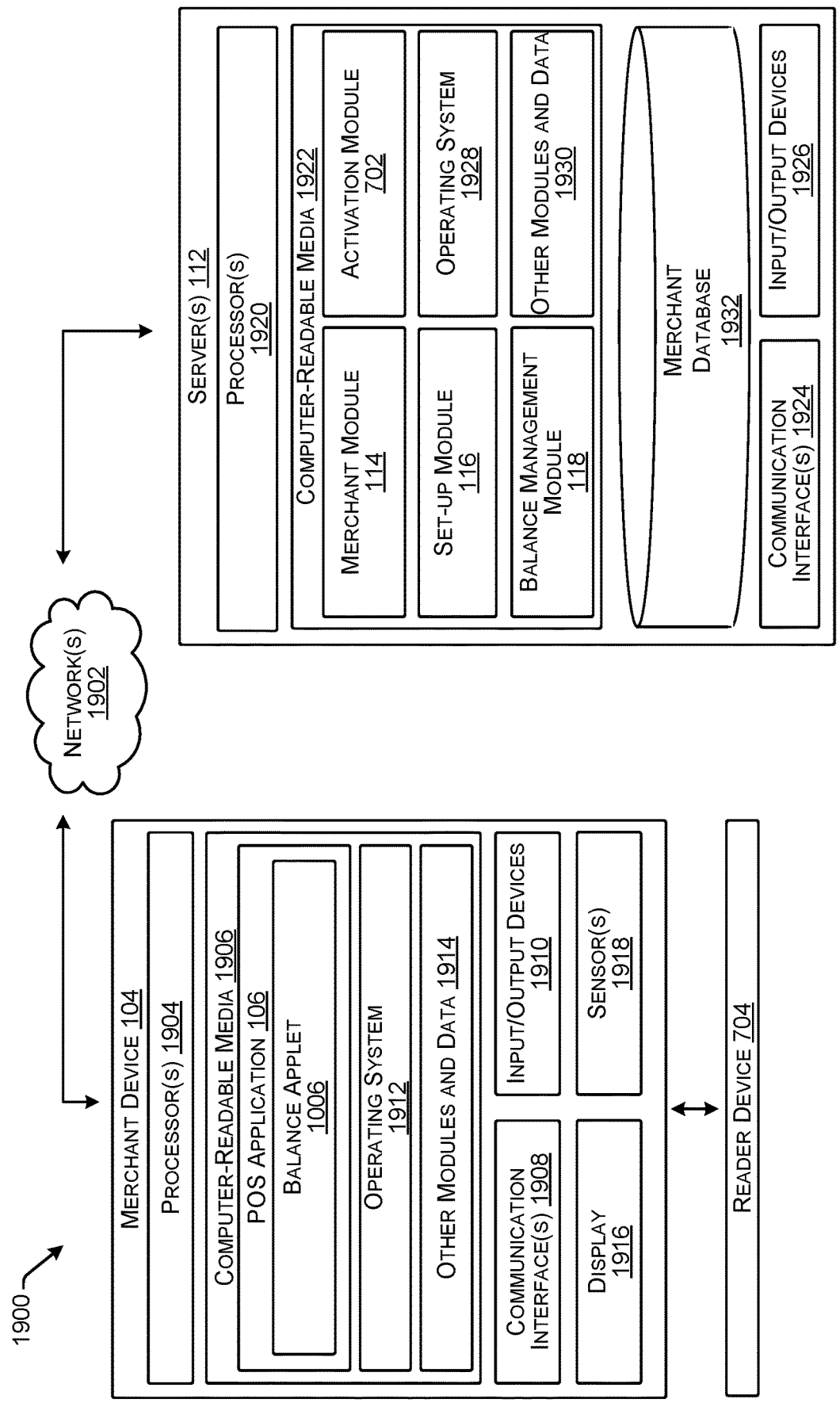
FIG. 19 depicts an illustrative block diagram illustrating a system for performing techniques as described herein.

FIG. 19 depicts an illustrative block diagram illustrating a system 1900 for performing techniques described herein. The system 1900 includes a merchant device 104, that communicates with server computing device(s) (e.g., server(s) 112) via network(s) 1902 (e.g., the Internet, cable network(s), cellular network(s), wireless network(s) (e.g., Wi-Fi) and wired network(s), as well as close-range communications such as Bluetooth®, Bluetooth® low energy, and the like). While a single merchant device 104 is illustrated, in additional or alternate examples, the system 1900 can have multiple merchant devices. Similarly, while the aforementioned description describes a single stored balance and merchant, in additional or alternative examples, the system 1900 can have multiple merchants and stored balances.

In at least one example, the merchant device 104 can be any suitable type of computing device, e.g., portable, semi-portable, semi-stationary, or stationary. Some examples of the merchant device 104 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 104 includes one or more processors 1904, one or more computer-readable media 1906, one or more communication interfaces 1908, and one or more input/output (I/O) devices 1910. Each processor 1904 can itself comprise one or more processors or processing cores. For example, the processor(s) 1904 can be implemented as one or more microprocessors, microcomputers, microcontrollers, digital signal processors, central processing units, state machines, logic circuitries, and/or any devices that manipulate signals based on operational instructions. In some examples, the processor(s) 1904 can be one or more hardware processors and/or logic circuits of any suitable type specifically programmed or configured to execute the algorithms and processes described herein. The processor(s) 1904 can be configured to fetch and execute computer-readable processor-executable instructions stored in the computer-readable media 1906.

Depending on the configuration of the merchant device 104, the computer-readable media 1906 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1906 can include, but is not limited to, RAM, ROM, EEPROM, flash memory, solid-state storage, magnetic disk storage, optical storage, and/or other computer-readable media technology. Further, in some examples, the merchant device 104 can access external storage, such as RAID storage systems, storage arrays, network attached storage, storage area networks, cloud storage, or any other medium that can be used to store information and that can be accessed by the processor(s) 1904 directly or through another computing device or network. Accordingly, the computer-readable media 1906 can be computer storage media able to store instructions, modules or components that can be executed by the processor(s) 1904. Further, when mentioned, non-transitory computer-readable media exclude media such as energy, carrier signals, electromagnetic waves, and signals per se.

The computer-readable media 1906 can be used to store and maintain any number of functional components that are executable by the processor(s) 1904. In some implementations, these functional components comprise instructions or programs that are executable by the processor(s) 1904 and that, when executed, implement operational logic for performing the actions and services attributed above to the merchant device 104. Functional components stored in the computer-readable media 1906 can include the POS application 106, which can include the balance applet 1006, at least some of the functionalities of which are described above. In other examples, the balance applet 1006 can be stored in the computer-readable media 1906 independently or associated with another application. Further, in some examples, the balance applet 1006 can be accessible via a web browser, etc.

Furthermore, the computer-readable media 1906 can include additional functional components, such as an operating system 1912 for controlling and managing various functions of the merchant device 104 and for enabling basic user interactions. In addition, the computer-readable media 1906 can also store data, data structures and the like, that are used by the functional components. Depending on the type of the merchant device 104, the computer-readable media 1906 can also optionally include other functional components and data, such as other modules and data 1914, which can include programs, drivers, etc., and the data used or generated by the functional components. Further, the merchant device 104 can include many other logical, programmatic and physical components, of which those described are merely examples that are related to the discussion herein.

The communication interface(s) 1908 can include one or more interfaces and hardware components for enabling communication with various other devices, such as over the network(s) 1902 or directly. For example, communication interface(s) 1908 can enable communication through one or more network(s) 1902, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1902 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant device 104 can further include the one or more I/O devices 1910. The I/O devices 1910 can include speakers, a microphone, a camera, and various user controls (e.g., buttons, a joystick, a keyboard, a keypad, etc.), a haptic output device, and so forth.

In at least one example, merchant device 104 can include a display 1916. Depending on the type of computing device(s) used as the merchant device 104, the display 1916 can employ any suitable display technology. For example, the display 1916 can be a liquid crystal display, a plasma display, a light emitting diode display, an OLED (organic light-emitting diode) display, an electronic paper display, or any other suitable type of display able to present digital content thereon. In some examples, the display 1916 can have a touch sensor associated with the display 1916 to provide a touchscreen display configured to receive touch inputs for enabling interaction with a graphic interface presented on the display 1916. Accordingly, implementations herein are not limited to any particular display technology. Alternatively, in some examples, the merchant device 104 may not include the display 1916, and information can be presented by other means, such as aurally.

In addition, the merchant device 104 can include sensor(s) 1918. The sensor(s) 1918 can include a GPS device able to indicate location information. Further, the sensor(s) 1918 can include, but are not limited to, an accelerometer, gyroscope, compass, proximity sensor, camera, microphone, and/or a switch. Additionally, the merchant device 104 can include various other components that are not shown, examples of which include removable storage, a power source, such as a battery and power control unit, a barcode scanner, a printer, a cash drawer, and so forth.

In addition, in some examples, the merchant device 104 can include or can be connectable to a reader device 704, as described above with reference to FIG. 7, for reading payment instruments and/or identifiers associated with payment objects. In some examples, as described above, the reader device 704 can plug in to a port in the merchant device 104, such as a microphone/headphone port, a data port, or other suitable port. The reader device 704 can include a read head for reading a magnetic strip of a payment card, and further can include encryption technology for encrypting the information read from the magnetic strip. Additionally or alternatively, the reader device 704 can be an EMV payment reader, which in some examples, can be embedded in the merchant device 104. Moreover, numerous other types of readers can be employed with the merchant device 104 herein, depending on the type and configuration of the merchant device 104.

The server(s) 112 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 112 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 112 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 112 can include one or more processors 1920, one or more computer-readable media 1922, one or more communication interfaces 1924, and one or more input/output devices 1926. Each processor 1920 can be a single processing unit or a number of processing units, and can include single or multiple computing units or multiple processing cores. The processor(s) 1920 can be implemented as one or more microprocessors, microcomputers, microcontrollers, digital signal processors, central processing units, state machines, logic circuitries, and/or any devices that manipulate signals based on operational instructions. For example, the processor(s) 1920 can be one or more hardware processors and/or logic circuits of any suitable type specifically programmed or configured to execute the algorithms and processes described herein. The processor(s) 1920 can be configured to fetch and execute computer-readable instructions stored in the computer-readable media 1922, which can program the processor(s) 1920 to perform the functions described herein.

The computer-readable media 1922 can include volatile and nonvolatile memory and/or removable and non-removable media implemented in any type of technology for storage of information, such as computer-readable instructions, data structures, program modules, or other data. Such computer-readable media 1922 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 112, the computer-readable media 1922 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1922 can be used to store any number of functional components that are executable by the processors 1920. In many implementations, these functional components comprise instructions or programs that are executable by the processors 1920 and that, when executed, specifically configure the one or more processors 1920 to perform the actions attributed above to the service provider and/or payment processing service. Functional components stored in the computer-readable media 1922 can include the merchant module 114, the set-up module 116, the balance management module 118, and the activation module 702. At least some of the functionality associated with the merchant module 114, the set-up module 116, the balance management module 118, and the activation module 702 is described above with reference to FIGS. 1-18. Additional functional components stored in the computer-readable media 1922 can include an operating system 1928 for controlling and managing various functions of the server(s) 112.

In at least one example, the computer-readable media 1922 can include or maintain other functional components and data, such as other modules and data 1930, which can include programs, drivers, etc., and the data used or generated by the functional components. Further, the server(s) 112 can include many other logical, programmatic and physical components, of which those described above are merely examples that are related to the discussion herein.

In at least one example, the computer-readable media 1922 can store a merchant database 1932. The merchant database 1932 can store merchant profiles corresponding to merchants that subscribe to services of the payment processing service. As described above, merchant profiles can include merchant data including, but not limited to, a merchant category classification (MCC), item(s) offered for sale by the merchant, transaction data associated with transactions conducted by the merchant (e.g., via the POS application 106), hardware (e.g., device type) used by the merchant, previous loans made to the merchant, previous defaults on said loans, an indication of risk (e.g., based at least in part on fraud, chargeback, etc.) associated with the merchant, etc. The merchant profile can securely store bank account information as provided by the merchant 102. Further, the merchant profile can store payment data associated with a payment instrument linked to a stored balance 120 of the merchant 102 and/or the stored balance 120.

The communication interface(s) 1924 can include one or more interfaces and hardware components for enabling communication with various other devices, such as over the network(s) 19002. For example, communication interface(s) 1924 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The server(s) 112 can further be equipped with various input/output (I/O) devices 1926. Such I/O devices 1926 can include a display, various user interface controls (e.g., buttons, joystick, keyboard, mouse, touch screen, etc.), audio speakers, connection ports and so forth.

The present subject matter proposes the integration of at least the aforementioned features into a seamless and convenient mechanism for registration of a payment instrument. With relation to the problems identified previously with conventional systems and methods, the software application itself becomes an active and cooperative component of the registration process, rather than the subject of it. Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments. Techniques described herein can be configured to operate in both real-time/online and offline modes.

While the aforementioned disclosure makes reference to user interactions via a UI presented via a display of a device, the UI can be presented via any input/output device. As an example, the UI can be output via a speaker, and augmented reality projector, etc. Further, while the aforementioned disclosure makes reference to the merchant interacting with the UI via a selectable control, in additional or alternative examples, the merchant can indicate a selection via a spoken input or other type of input.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
   one or more processors;
   one or more computer-readable media that, when executed by the one or more processors, cause the one or more processors to perform operations comprising:
      receiving, by a payment processing service, transaction data associated with a point-of-sale (POS) transaction between a first merchant and a second merchant;
      analyzing the transaction data;
      determining, by the payment processing service and based at least in part on the analyzing, a classification associated with the POS transaction, wherein the classification indicates that an item included in the POS transaction is a business expense or a personal expense; and
      causing, by the payment processing service and based at least in part on the determining, a merchant device of the first merchant to present a user interface (UI) associated with a stored balance of the first merchant, the UI including information associated with the POS transaction and an indicator associated with the classification.

2. The system of claim 1, further comprising:
   storing, based at least in part on receiving the transaction data, an indication of the POS transaction in a ledger associated with the first merchant, the ledger being maintained by the payment processing service; and
   causing, based at least in part on the analyzing, the indicator to be associated with the indication of the POS transaction in the ledger.

3. The system of claim 1, wherein the determining is based at least in part on analyzing the transaction data using one or more machine-trained models configured to output an indication of whether the item included in the POS transaction corresponds to the business expense or the personal expense.

4. The system of claim 1, wherein the transaction data comprises first transaction data, the transaction comprises a first POS transaction, the classification comprises a first classification, the information comprises first information, the indicator comprises a first indicator, and further comprising:
   receiving, by the payment processing service, second transaction data associated with a second POS transaction between the first merchant and a third merchant;
   analyzing the second transaction data;
   determining, by the payment processing service and based at least in part on the analyzing the second transaction data, a second classification associated with the second POS transaction;
   storing, based at least in part on the determining the second classification, a first indication associated with the first classification associated with the first POS transaction and a second indication associated with the second classification associated with the second POS transaction; and
   causing, based at least in part on the first indication and the second indication, the UI to present the first indicator, the first information associated with the first POS transaction, second information associated with the second POS transaction, and a second indicator associated with the second POS transaction.

5. The system of claim 4, wherein the first indicator comprises a first visual element corresponding to the classification and the second indicator comprises a second, different visual element corresponding to the second classification.

6. The system of claim 4, wherein the first classification corresponds the business expense and the second classification is the personal expense.

7. The system of claim 1, further comprising:
   causing the UI to present at least a portion of a ledger associated with the stored balance of the first merchant, the UI including the indicator associated with the classification associated with the POS transaction and one or more additional indicators associated with one or more additional classifications of one or more additional POS transactions between the first merchant and one or more other merchants;
   receiving, via the UI, first input indicating a selection of the indicator associated with the POS transaction; and
   causing, based at least in part on the first input, the UI to present additional information associated with the POS transaction.

8. The system of claim 7, wherein the classification comprises a first classification, further comprising:
   receiving, via the UI, second input indicating a selection of a second classification associated with the POS transaction;

storing, based at least in part on the second input, an updated indication associated with the POS transaction, the updated indication corresponding to the second classification; and causing, the UI to present the at least the portion of the ledger, wherein the UI includes an updated indicator associated with the POS transaction, the updated indicator being associated with the second classification associated with the POS transaction.

9. A method, comprising:

receiving, by a payment processing service, transaction data associated with a transaction between a first merchant and a second merchant;

analyzing the transaction data;

determining, by the payment processing service and based at least in part on the analyzing, a classification associated with the transaction, wherein the classification indicates that an item included in the transaction is a business expense or a personal expense; and causing, by the payment processing service and based at least in part on the determining, a merchant device of the first merchant to present a user interface (UI) associated with a stored balance of the first merchant, the UI including information associated with the transaction and an indicator associated with the classification associated with the transaction.

10. The method of claim 9, further comprising:

storing, based at least in part on receiving the transaction data, an indication of the transaction in a ledger associated with the first merchant, the ledger being maintained by the payment processing service; and causing, based at least in part on the analyzing, the indicator to be associated with the indication of the transaction in the ledger.

11. The method of claim 9, wherein the determining is based at least in part on analyzing the transaction data using one or more machine-trained models configured to output an indication of whether the item included in the transaction corresponds to the business expense or the personal expense.

12. The method of claim 9, wherein the transaction data comprises first transaction data, the transaction comprises a first transaction, the classification comprises a first classification, the information comprises first information, the indicator comprises a first indicator, and further comprising:

receiving, by the payment processing service, second transaction data associated with a second transaction between the first merchant and a third merchant;

analyzing the second transaction data;

determining, by the payment processing service and based at least in part on the analyzing the second transaction data, a second classification associated with the second transaction;

storing, based at least in part on determining the second classification, a first indication associated with the first classification associated with the first transaction and a second indication associated with the second classification associated with the second transaction; and causing, based at least in part on the first indication and the second indication, the UI associated with the stored balance of the first merchant to be presented, the UI including the first indicator, the first information associated with the first transaction, second information associated with the second transaction, and a second indicator associated with the second transaction.

13. The method of claim 12, wherein the first indicator is different from the second indicator, and wherein the first classification corresponds to an indication that the item included in the transaction is the business expense and the second classification corresponds to an indication that a second item included in the second transaction is the personal expense.

14. The method of claim 9, further comprising:

causing the UI to present at least a portion of a ledger associated with the stored balance of the first merchant, the UI including the indicator associated with the classification associated with the transaction and one or more additional indicators associated with one or more additional classifications of one or more additional transactions between the first merchant and one or more other merchants;

receiving, via the UI, first input indicating a selection of the indicator associated with the transaction; and causing, based at least in part on the first input, the UI to present additional information associated with the transaction.

15. The method of claim 14, wherein the classification comprises a first classification, further comprising:

receiving, via the UI, second input indicating a selection of a second classification associated with the transaction;

storing, based at least in part on the second input, an updated indication associated with the transaction, the updated indication corresponding to the second classification; and causing, the UI to present the at least the portion of the ledger, wherein the UI includes an updated indicator associated with the transaction, the updated indicator being associated with the second classification associated with the transaction.

16. One or more non-transitory computer-readable media that, when executed by one or more processors, cause the one or more processors to perform operations comprising:

receiving transaction data associated with a transaction processed by a payment processing service on behalf of a plurality of merchants, the transaction being between a first merchant of the plurality of merchants and a second merchant;

analyzing the transaction data;

determining, based at least in part on the analyzing, a classification associated with the transaction, wherein the classification indicates that an item included in the transaction is a business expense or a personal expense; and causing, based at least in part on the determining, a merchant device of the first merchant to present a user interface (UI) associated with a stored balance of the first merchant, the UI including information associated with the transaction and an indicator associated with the classification.

17. The one or more non-transitory computer-readable media as claim 16 recites, wherein the transaction data comprises first transaction data, the transaction comprises a first transaction, the classification comprises a first classification, the information comprises first information, the indicator comprises a first indicator, and the operations further comprising:

receiving second transaction data associated with a second transaction between the first merchant and a third merchant;

analyzing the second transaction data;

determining, based at least in part on the analyzing the second transaction data, a second classification associated with the second transaction;

storing, based at least in part on the determining and in a ledger associated with the first merchant that is maintained by the payment processing service, a first indication associated with the first classification associated with the first transaction and a second indication associated with the second classification associated with the second transaction; and causing, based at least in part on the first indication and the second indication, the UI to present the first indicator, the first information associated with the first transaction, second information associated with the second transaction, and a second indicator associated with the second transaction.

18. The one or more non-transitory computer-readable media as claim 16 recites, wherein the transaction data comprises item-level information associated with the transaction.

19. The one or more non-transitory computer-readable media as claim 16 recites, the operations further comprising:
causing the UI to present at least a portion of a ledger associated with the stored balance of the first merchant, the UI including the indicator associated with the classification associated with the transaction and one or more additional indicators associated with one or more additional classifications of one or more additional transactions between the first merchant and one or more other merchants;
receiving, via the UI, first input indicating a selection of the indicator associated with the transaction; and
causing, based at least in part on the first input, the UI to present additional information associated with the transaction.

20. The one or more non-transitory computer-readable media as claim 19 recites, wherein the classification comprises a first classification, the operations further comprising:
receiving, via the UI, second input indicating a selection of a second classification associated with the transaction;
storing, based at least in part on the second input, an updated indication associated with the transaction, the updated indication corresponding to the second classification; and
causing, the UI to present the at least the portion of the ledger, wherein the UI includes an updated indicator associated with the transaction, the updated indicator being associated with the second classification associated with the transaction.

\* \* \* \* \*